US006686432B2

(12) United States Patent
Coca et al.

(10) Patent No.: US 6,686,432 B2
(45) Date of Patent: Feb. 3, 2004

(54) ALTERNATING COPOLYMERS OF ISOBUTYLENE TYPE MONOMERS

(75) Inventors: Simion Coca, Pittsburgh, PA (US); Edward R. Coleridge, Lower Burrell, PA (US); Gregory J. McCollum, Gibsonia, PA (US); James B. O'Dwyer, Valencia, PA (US); James E. Poole, Gibsonia, PA (US); Victoria A. Trettel, Freeport, PA (US)

(73) Assignee: PPG Industries Ohio, inc., Cleveland, OH (US)

( * ) Notice: Subject to any disclaimer, the term of this patent is extended or adjusted under 35 U.S.C. 154(b) by 134 days.

(21) Appl. No.: 10/076,984

(22) Filed: Feb. 15, 2002

(65) Prior Publication Data

US 2003/0170394 A1 Sep. 11, 2003

(51) Int. Cl.$^7$ ................................................ C08F 10/00
(52) U.S. Cl. ................. 526/348.7; 526/264; 526/303.1; 526/317.1; 526/320; 526/329; 526/332; 526/347; 526/348
(58) Field of Search .............................. 526/264, 303.1, 526/317.1, 320, 329, 332, 347, 348, 348.7

(56) References Cited

U.S. PATENT DOCUMENTS

| | | | |
|---|---|---|---|
| 2,378,629 A | 6/1945 | Hanford | 526/204 |
| 2,411,599 A | 11/1946 | Sparks et al. | 522/60 |
| 2,531,196 A | 11/1950 | Brubaker et al. | 526/225 |
| 3,856,685 A | * 12/1974 | Mori et al. | 252/56 R |
| 3,919,180 A | * 11/1975 | Furukawa et al. | 260/80.7 |
| 3,947,338 A | 3/1976 | Jerabek et al. | 204/181 |
| 3,957,732 A | * 5/1976 | Hirooka et al. | 526/90 |
| 3,984,299 A | 10/1976 | Jerabek | 204/181 |
| 4,139,480 A | * 2/1979 | Gardiner et al. | 252/51.5 A |
| 4,147,679 A | 4/1979 | Scriven et al. | 260/29.2 TN |
| 4,147,688 A | 4/1979 | Makhlouf et al. | 260/33.6 EP |
| 4,220,679 A | 9/1980 | Backhouse | 427/401 |
| 4,403,003 A | 9/1983 | Backhouse | 427/407.1 |
| 4,889,890 A | 12/1989 | Kerr et al. | 525/113 |
| 4,937,288 A | 6/1990 | Pettit, Jr. et al. | 525/176 |
| 4,997,900 A | 3/1991 | Brinkman | 528/45 |
| 5,071,904 A | 12/1991 | Martin et al. | 524/458 |
| 5,098,955 A | 3/1992 | Pettit, Jr. | 525/194 |
| 5,202,382 A | 4/1993 | Pettit, Jr. | 525/108 |
| 5,214,101 A | 5/1993 | Pettit, Jr. et al. | 525/176 |
| 5,356,973 A | 10/1994 | Taljan et al. | 524/314 |
| 5,407,707 A | 4/1995 | Simeone et al. | 427/410 |
| 5,439,896 A | 8/1995 | Ito et al. | 525/107 |
| 5,508,337 A | 4/1996 | Wamprecht et al. | 524/507 |
| 5,510,444 A | 4/1996 | Halpaap et al. | 528/45 |
| 5,552,487 A | 9/1996 | Clark et al. | 525/131 |
| 5,554,692 A | 9/1996 | Ross | 525/124 |
| 5,663,240 A | 9/1997 | Simeone et al. | 525/327.3 |
| 5,710,214 A | 1/1998 | Chou et al. | 525/124 |
| 5,777,061 A | 7/1998 | Yonek et al. | 528/45 |
| 5,807,937 A | 9/1998 | Matyjaszewski et al. | 526/135 |
| 5,976,701 A | 11/1999 | Barancyk et al. | 428/423.1 |
| 5,989,642 A | 11/1999 | Singer et al. | 427/407.1 |
| 6,111,001 A | 8/2000 | Barancyk et al. | 524/211 |
| 6,114,489 A | 9/2000 | Vicari et al. | 528/84 |
| 6,281,272 B1 | 8/2001 | Baldy et al. | 523/501 |

OTHER PUBLICATIONS

Greenley, "Q and e Values for Free Radical Copolymerizations of Vinyl Monomers and Telogens," *Polymer Handbook*, Fourth Edition, John Wiley & Sons, Inc., pp. 309–319, 1999.

Odian, "Chain Copolymerization," *Principles of Polymerization*, Third Edition, John Wiley & Sons, Inc., pp. 452–491, 1991.

Cowie, Alternating Copolymers, Plenum Press, pp. 1–137, 1985.

Rzaev et al., "Complex–Radical Copolymerization of 2,4, 4–trimethylpentene–1 with Maleic Anhydride," *Eur. Polym. J.*, vol. 34, No. 7, pp. 981–985, 1998.

Mashita et al., "Alternating Copolymerization of Isobutylene and Acrylic Ester with Alkylboron Halide," *Polymer*, vol. 36, No. 15, pp. 2973–2982, 1995.

Mashita et al., "Alternating Copolymers of Isobutylene and Acrylic Ester by Complexed Copolymerization," *Polymer*, vol. 36, No. 15, pp. 2983–2988, 1995.

Kuntz et al., "Poly [2,2–Dimethyl–4–(methoxylcarbonyl) butylene]: Synthesis with an Ethylaluminum Sesquichloride–Peroxide Initiator and NMR Characterization," *J. of Polymer Science*: Polymer Chemistry Edition, vol. 16, pp. 1747–1753, 1978.

Hirooka et al., "Complexed Copolymerization of Vinyl Compounds with Alkylaluminum Halides," *Journal of Polymer Science: Polymer Chemistry Edition*, vol. 11, pp. 1281–1306, 1973.

ASTM D–1200—94, "Standard Test Method for Viscosity by Ford Viscosity Cup," *Amer. Soc. Test. Mat.*, pp. 103–105, 1994.

ASTM D–2369—92, "Standard Test Method for Volatile Content of Coatings," *Amer. Soc. Test. Mat.*, pp. 46–48, 1992.

ASTM D–3359—97, "Standard Test Methods for Measuring Adhesion by Tape Test," *Amer. Soc. Test. Mat.*, pp. 1–7, 1998.

ASTM D–4370—84, "Standard Test Methods for Acid and Base Milliequivalent Content of Electrocoat Bath," *Amer. Soc. Test. Mat.*, pp. 780–782, 1984.

"Reference Method 24: Determination of Volatile Matter Content, Water Content, Density, Volume Solids, and Weight Solids of Surface Coatings," *Federal Register, EPA Reference Methods 24 and 24 A*, vol. 57, No. 133, pp. 125–127, 1992.

* cited by examiner

*Primary Examiner*—Helen L. Pezzuto
(74) *Attorney, Agent, or Firm*—William J. Uhl

(57) ABSTRACT

A copolymer composition that includes a copolymer comprised of at least 30 mol % of residues having the following alternating residues from a donor monomer and from an acceptor monomer. The copolymer contains at least 15 mol % of an isobutylene type donor monomer and at least 15 mol % of an acrylic monomer as an acceptor monomer. The copolymer is substantially free of maleate or fumarate monomer segments and the copolymer composition is substantially free of Lewis acids and transition metals. Also disclosed is a thermosetting composition that includes a reactant comprising functional groups, a crosslinking agent having at least two functional groups that are reactive with the functional groups first reactant, and a copolymer flow control agent that includes the copolymer composition as well as substrates coated with the thermosetting composition.

44 Claims, No Drawings

ALTERNATING COPOLYMERS OF ISOBUTYLENE TYPE MONOMERS

BACKGROUND OF THE INVENTION

1. Field of the Invention

The present invention relates generally to copolymers of vinyl monomers. More specifically, the present invention is directed to copolymers containing isobutylene type monomers and their use as flow control agents in thermosetting coating compositions.

2. Description of Related Art

It is often observed that monomers that do not readily homopolymerize are able to undergo rapid copolymerization reactions with each other. The most typical situation occurs when a strong electron donating monomer is mixed with a strong electron accepting monomer from which a regular alternating copolymer results after free radical initiation. Maleic anhydride is a widely used example of a strong electron accepting monomer. Styrene and vinyl ethers are typical examples of an electron donating monomer. Systems, such as maleic anhydride—styrene, are known to form charge transfer complexes, which tend to place the monomers in an alternating sequence prior to initiation. The application of the free radical initiator "ties" the ordered monomers together to form an alternating copolymer (Cowie, Alternating Copolymers, Plenum, N.Y. (1985)).

U.S. Pat. No. 2,378,629 to Hanford and U.S. Pat. No. 4,151,336 to Sackmann et al. disclose that even when a moderately electron donating monomer, such as diisobutylene, is copolymerized with a strong electron acceptor monomer, such as maleic anhydride, an alternating copolymer results.

When a moderately electron donating monomer, such as isobutylene, is copolymerized with a moderately electron accepting monomer, such as an acrylic ester, poor incorporation of the electron donating monomer results. For example, free radical copolymerization of isobutylene (IB) and acrylic monomers have resulted in copolymers that contain at most 20–30% of IB and have low molecular weights because of degradative chain transfer of IB. Examples of such copolymerizations of IB are disclosed by U.S. Pat. No. 2,411,599 to Sparks et al. and U.S. Pat. No. 2,531,196 to Brubaker et al.

The ability to make copolymers of acrylic monomers and IB type monomers is desired in the art. For example, many patents express the potential for using IB-containing polymers in coating compositions. For example, U.S. Pat. No. 6,114,489 to Vicari et al. discloses a coating composition that includes a functional acrylic resin binder; a co-reactant capable of reacting with the functionality of the acrylic binder; a degasser; and a hyperbranched polyester flow and leveling agent. IB is suggested as a potential co-monomer for use in the acrylic binder as part of a long list of monomers. U.S. Pat. No. 5,552,487 to Clark et al. discloses powder coating compositions that include a copolymer having a reactive functionality and a suitable crosslinking agent capable of reaction with the reactive functionality of the copolymer. The copolymer is a made by copolymerizing functional monomers with other monomers, isobutylene being one among many listed as potential co-monomers. Although only two are referenced herein, of the many patents that express the possibility of using isobutylene-type co-monomers, none actually shows or discloses a working example of such a copolymer.

The fact that few examples of isobutylene-type monomer-containing copolymers are found is due to the generally non-reactive nature of isobutylene with acrylic and methacrylic monomers. Reactivity ratios for monomers can be calculated using the Alfrey—Price Q-e values (Robert Z. Greenley, Polymer Handbook, Fourth Edition, Brandrup, Immergut and Gulke, editors, Wiley & Sons, New York, N.Y., pp. 309–319 (1999)). The calculations may be carried out using the formulas I and II:

$$r_1 = (Q_1/Q_2)\exp\{-e_1(e_1-e_2)\} \qquad \text{I}$$

$$r_2 = (Q_2/Q_1)\exp\{-e_2(e_2-e_1)\} \qquad \text{II}$$

where $r_1$, and $r_2$ are the respective reactivity ratios of monomers 1 and 2, and $Q_1$, and $Q_2$ and $e_1$ and $e_2$ are the respective reactivity and polarity values for the respective monomers (Odian, *Principals of Polymerization*, $3^{rd}$ Ed., Wiley-Interscience, New York, N.Y., Chapter 6, pp. 452–467 and 489–491 (1991)). Table 1 shows the calculated reactivity ratios of selected monomers with isobutylene:

TABLE 1

| Monomer | $r_1$ (isobutylene) | $r_2$ |
|---|---|---|
| Methyl acrylate | 0.10 | 13.67 |
| Glycidyl methacrylate | 0.08 | 34.17 |
| Methacrylic acid | 0.09 | 39.71 |

As one skilled in the art of polymer chemistry can appreciate, when $r_1$ is near zero and $r_2$ has a value of 10 or more, monomer 2 is reactive toward both monomers and monomer 1 is reactive toward neither monomer. In other words, it is extremely difficult to prepare copolymers having significant amounts of both monomers. It is not surprising then that few examples can be found of coating compositions that include isobutylene-type monomer-containing copolymers, because the monomers do not tend to copolymerize.

A few examples of acrylic ester or acrylonitrile copolymers made by copolymerizing with monomers such as propylene, isobutylene, and styrene, have been accomplished in the presence of Lewis acids, such as alkylaluminum halides, to give 1:1 alternating copolymers. The alternating copolymers were obtained when the concentration ratio of the Lewis acids to the acrylic esters was 0.9 and the concentration of IB was greater than the concentration of the acrylic esters (Hirooka et al., J. Polym. Sci. Polym. Chem., 11, 1281 (1973)). The metal halides vary the reactivity of the monomers by complexing with the them. The electron donor monomer—electron acceptor monomer—metal halide complex leads to alternating copolymers (Mashita et al. Polymer, Vol. 36, No. 15, pp. 2973–2982, (1995)).

Copolymers of IB and methyl acrylate (MA) have also been obtained by using ethyl aluminum sesquichloride and 2-methyl pentanoyl peroxide as an initiating system. The resulting copolymer had an alternating structure, with either low (Kuntz et al, J. Polym. Sci. Polym. Chem., 16, 1747 (1978)) or high isotacticity in the presence of $EtAlCl_2$ (10 molar % relative to MA). (Florjanczyk et al., Makromol. Chem., 183, 1081 (1982)).

Another method for making IB copolymers with acrylic esters involved alkyl boron halide, which was found to be much more active than alkyl aluminum halides in forming alternating copolymers. The resulting copolymer was an elastomer of high tensile strength and high thermal decomposition temperature with good oil resistance, especially at elevated temperatures (Mashita et al., Polymer, 36, 2983 (1995)).

U.S. Pat. No. 5,807,937 to Matyjaszewski et al. discloses a method of making alternating copolymers of isobutylene and methyl acrylate using an atom transfer radical polymerization (ATRP) process. The method requires the use of a suitable ATRP initiator, such as 1-phenylethyl bromide, and suitable transition metal salts, such as CuBr, with a ligand, such as 2,2'-bipyridyl, to perform the complex redox initiation and propagation steps of the polymerization process.

Copolymers containing relatively high amounts (≧30 mol %) of IB and acrylic esters have only been attained by free radical polymerization when Lewis acids or ATRP initiation systems have been employed. The polymer that results from such processes requires expensive and time consuming clean up to remove the transition metal salt and/or Lewis acid residues in order to make the polymer commercially useful.

Coating compositions, liquid and powder coatings for example, are used in a wide variety of applications, including for example, the automotive, appliance, and industrial markets. Coatings are often used to provide decorative qualities and/or corrosion protection to the substrates over which they are applied. Correspondingly, applied coatings are typically required to have at least a continuous defect-free surface. The automotive industry has particularly strict requirements as to the smoothness of the coatings that are used, as is the case with automotive clear topcoat compositions.

Coating compositions typically contain a flow control agent (also referred to as a flow modifier) to improve the appearance of the cured coating. Flow control agents have surface active properties and are thought to improve the appearance of a cured coating by altering the flow and leveling of the applied coating during its cure cycle. Flow control agents containing functional groups, such as carboxylic acid groups and/or hydroxyl groups, are known and, in addition to enhancing appearance, can also improve adhesion of the coating to the substrate over which it is applied, and/or improve the adhesion or compatibility of a subsequently applied coating.

Coating compositions are typically required to provide optimum properties, such as appearance and/or corrosion resistance, at a minimum film thickness. For example, in the automotive industry clear topcoats are typically required to have cured film thickness of no greater than 50 microns (2 mils). Advantages associated with coatings applied at lower film thickness include, for example, reduced material costs and weight gain of the coated ware, which is particularly desirable in the aircraft industry. However, as the film build of an applied coating composition is decreased, the appearance of the resulting cured coating typically diminishes, for example, as evidenced by lower measured gloss values.

In addition to the application of coatings at lower film builds, investigation and development in recent years has been directed toward reducing the environmental impact of coating compositions, in particular, the associated emissions into the air of volatile organics during their use. Accordingly, interest in coatings having lower volatile organic content (VOC), for example powder coatings and high solids coatings, has been increasing. Powder coating compositions are free flowing particulate compositions that are essentially free of solvents. The appearance of powder coatings typically degrades rather precipitously with decreasing film thickness, for example, at film thickness less than 75 microns (3 mils), and, in particular, at film thickness less than 50 microns (2 mils). In the absence of solvents that can enhance the flow and leveling of an applied coating, a flow control agent is a critical component in the majority of powder coating compositions.

Copolymer compositions that contain Lewis acids and/or transition metals intermingled with the copolymer can have a number of drawbacks when used commercially, as in coatings for example. First, some Lewis acids and transition metals are toxic and have adverse environmental effects if they are leached from the copolymer and enter the environment. Second, in coating applications the Lewis acids and transition metals may lead to poor stability when exposed to UV light or simply cause the coating to discolor. In other applications the Lewis acids and transition metals may react with other ingredients in a formulation resulting in undesired properties, such as a shortened shelf-life for a given formulation.

Therefore, there is a clear and present need for copolymers containing isobutylene type monomers that are not made using and are substantially free of Lewis acids and/or transition metals.

SUMMARY OF THE INVENTION

The present invention is directed to a copolymer composition that includes a copolymer comprised of at least 30 mol % of residues having the following alternating structural units:

—[DM—AM]— where DM represents a residue from a donor monomer and AM represents a residue from an acceptor monomer. The copolymer contains at least 15 mol % of a donor monomer (an isobutylene type monomer) having the following structure (I):

where $R^1$ is linear or branched $C_1$ to $C_4$ alkyl, $R^2$ is selected from the group consisting of methyl, linear, cyclic or branched $C_1$ to $C_{20}$ alkyl, alkenyl, aryl, alkaryl, and aralkyl. The copolymer further contains at least 15 mol % of an acrylic monomer as an acceptor monomer. The present copolymer is substantially free of maleate monomer segments and fumarate monomer segments and the present copolymer composition is substantially free of Lewis acids and transition metals.

The present invention is further directed to a thermosetting composition. The thermosetting composition includes a first reactant comprising functional groups, a crosslinking agent having at least two functional groups that are reactive with the functional groups of the first reactant in (a), and a copolymer flow control agent that includes the copolymer of the present invention.

The present invention is also directed to a method of coating a substrate. The method includes the steps of applying the thermosetting composition of the present invention to the substrate, coalescing the thermosetting composition to form a substantially continuous film, and curing the thermosetting composition. The present invention is additionally directed to a substrate coated using the present method.

DETAILED DESCRIPTION OF THE INVENTION

Other than in the operating examples, or where otherwise indicated, all numbers or expressions referring to quantities of ingredients, reaction conditions, etc., used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

As used herein, the term "copolymer composition" is meant to include a synthesized copolymer as well as residues from initiators, catalysts, and other elements attendant to the synthesis of the copolymer, but not covalently incorporated thereto. Such residues and other elements considered as part of the copolymer composition are typically mixed or co-mingled with the copolymer such that they tend to remain with the copolymer when it is transferred between vessels or between solvent or dispersion media.

As used herein, the term "substantially free" is meant to indicate that a material is present as an incidental impurity. In other words, the material is not intentionally added to an indicated composition, but may be present at minor or inconsequential levels because it was carried over as an impurity as part of an intended composition component.

The terms "donor monomer" and "acceptor monomer" are used throughout this application. With regard to the present invention, the term "donor monomer" refers to monomers that have a polymerizable ethylenically unsaturated group that has relatively high electron density in the ethylenic double bond, and the term "acceptor monomer" refers to monomers that have a polymerizable ethylenically unsaturated group that has relatively low electron density in the ethylenic double bond. This concept has been quantified to an extent by the Alfrey-Price Q-e scheme (Robert Z. Greenley, Polymer Handbook, Fourth Edition, Brandrup, Immergut and Gulke, editors, Wiley & Sons, New York, N.Y., pp. 309–319 (1999)). All e values recited herein are those appearing in the Polymer Handbook unless otherwise indicated.

In the Q-e scheme, Q reflects the reactivity of a monomer and e represents the polarity of a monomer, which indicates the electron density of a given monomer's polymerizable ethylenically unsaturated group. A positive value for e indicates that a monomer has a relatively low electron density and is an acceptor monomer, as is the case for maleic anhydride, which has an e value of 3.69. A low or negative value for e indicates that a monomer has a relatively high electron density and is a donor monomer, as is the case for vinyl ethyl ether, which has an e value of −1.80.

As referred to herein, a "strong acceptor monomer" is meant to include those monomers with an e value greater than 2.0. The term "mild acceptor monomer" is meant to include those monomers with an e value greater than 0.5 up to and including those monomers with an e value of 2.0. Conversely, the term "strong donor monomer" is meant to include those monomers with an e value of less than −1.5, and the term "mild donor monomer" is meant to include those monomers with an e value of less than 0.5 to those with an e value of −1.5.

The present invention is directed to a copolymer composition wherein at least 30 mol %, in many cases at least 40 mol %, typically at least 50 mol %, in some cases at least 60 mol %, and in other cases at least 75 mol % of residues of the copolymer are derived from alternating sequences of donor monomer—acceptor monomer pairs, having the alternating monomer residue units of structure:

—[DM—AM]— where DM represents a residue from a donor monomer and AM represents a residue from an acceptor monomer. The copolymer may be a 100% alternating copolymer of DM and AM. More particularly, at least 15 mol % of the copolymer comprising a donor monomer having the following structure (I):

where $R^1$ is linear or branched $C_1$ to $C_4$ alkyl, $R^2$ is one or more of methyl, linear, cyclic or branched $C_1$ to $C_{20}$ alkyl, alkenyl, aryl, alkaryl or aralkyl. Further, at least 15 mol % of the copolymer includes an acrylic monomer as an acceptor monomer.

Of note in the present copolymer is that the copolymer incorporates a substantial portion of alternating residues of a mild donor monomer as described by structure I and a mild acceptor monomer, which is an acrylic monomer. A non-limiting list of published e values for monomers that may be included as monomers described by structure I and acrylic monomers of the present invention are shown in Table 2.

TABLE 2

Alfrey-Price e values for Selected Monomers

| Monomer | e value |
| --- | --- |
| Monomers of structure 1 | |
| Isobutylene | −1.20[1] |
| Diisobutylene | 0.49[2] |
| Acrylic Monomers | |
| Acrylic acid | 0.88[1] |
| Acrylamide | 0.54[1] |
| Acrylonitrile | 1.23[1] |
| Methyl acrylate | 0.64[1] |
| Ethyl acrylate | 0.55[1] |
| Butyl acrylate | 0.85[1] |
| Benzyl acrylate | 1.13[1] |
| Glycidyl acrylate | 1.28[1] |

[1]Polymer Handbook, Fourth Edition (1999)
[2]Rzaev et al., Eur. Polym. J., Vol. 24, No. 7, pp. 981–985 (1998)

The present copolymer composition is substantially free of maleate monomer residues and fumarate monomer residues, which typically have e values greater than 2.0. These types of multifunctional monomers provide too many functional groups to the copolymer. This can create problems, for example, in coatings where a thermosetting composition may have a short shelf-life due to the overly functional nature of the copolymer.

Further, the present copolymer composition is substantially free of transition metals and Lewis acids, which, as noted above, have been used in the prior art to make alternating copolymers of mild donor monomers and mild acceptor monomers. The present invention does not utilize transition metal or Lewis acid adjuncts in preparing the present copolymer composition, therefore, they need not be removed after polymerization and the resulting copolymer compositions will not suffer the drawbacks inherent in those that contain transition metals or Lewis acids.

Any suitable donor monomer may be used in the present invention. Suitable donor monomers that may be used include strong donor monomers and mild donor monomers. The present invention is particularly useful for preparing alternating copolymers where a mild donor molecule is used. The present copolymers will include a mild donor monomer described by structure I, such as isobutylene, diisobutylene, dipentene, and isoprenol, and may additionally include other suitable mild donor monomers. The donor monomer of structure I may have functional groups. For example, the group $R^2$ of the donor monomer of structure I may include one or more functional groups, such as hydroxy, epoxy, carboxylic acid, ether, carbamate, and amide.

The mild donor monomer of structure I is present in the copolymer composition at a level of at least 15 mol %, in some cases at least 25 mol %, typically at least 30 mol %, and, in some cases, at least 35 mol %. The mild donor monomer of structure I is present in the copolymer composition at a level of up to 50 mol %, in some cases up to 47.5 mol %, typically up to 45 mol %, and, in some cases, up to 40 mol %. The level of the mild donor monomer of structure I used is determined by the properties that are to be incorporated into the copolymer composition. Residues from the mild donor monomer of structure 1 may be present in the copolymer composition in any range of values inclusive of those stated above.

Suitable other donor monomers that may be used in the present invention include, but are not limited to, ethylene, butene, styrene, substituted styrenes, methyl styrene, vinyl ethers, vinyl esters, vinyl pyridines, divinyl benzene, vinyl naphthalene, and divinyl naphthalene. Vinyl esters include vinyl esters of carboxylic acids, which include, but are not limited to, vinyl acetate, vinyl butyrate, vinyl 3,4-dimethoxybenzoate, and vinyl benzoate. The use of other donor monomers is optional, when other donor monomers are present, they are present at a level of at least 0.01 mol % of the copolymer composition, often at least 0.1 mol %, typically at least 1 mol %, and, in some cases, at least 2 mol %. The other donor monomers may be present at up to 25 mol %, in some cases up to 20 mol %, typically up to 10 mol %, and, in some cases, up to 5 mol %. The level of other donor monomers used is determined by the properties that are to be incorporated into the copolymer composition. Residues from the other donor monomers may be present in the copolymer composition in any range of values inclusive of those stated above.

The copolymer composition includes acceptor monomers as part of the alternating donor monomer—acceptor monomer units along the copolymer chain. Any suitable acceptor monomer may be used. Suitable acceptor monomers include strong acceptor monomers and mild acceptor monomers. A non-limiting class of suitable acceptor monomers are those described by the structure (II):

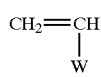

(II)

where W is selected from the group consisting of —CN, —X, and —C(=O)—Y, wherein Y is selected from the group consisting of —NR$^3_2$, —O—R$^5$—O—C(=O)—NR$^3_2$, and —OR$^4$, R$^3$ is selected from the group consisting of H, linear or branched $C_1$ to $C_{20}$ alkyl, and linear or branched $C_1$ to $C_{20}$ alkylol, R$^4$ is selected from the group consisting of H, poly(ethylene oxide), poly(propylene oxide), linear or branched $C_1$ to $C_{20}$ alkyl, alkylol, aryl, and aralkyl, linear or branched $C_1$ to $C_{20}$ fluoroalkyl, fluoroaryl and fluoroaralkyl, a siloxane radical, a polysiloxane radical, an alkyl siloxane radical, an ethoxylated trimethylsilyl siloxane radical, and a propoxylated trimethylsilyl siloxane radical, R$^5$ is a divalent linear or branched $C_1$ to $C_{20}$ alkyl linking group, and X is a halide.

A class of mild acceptor monomers that are included in the present copolymer composition are acrylic acceptor monomers. Suitable acrylic acceptor monomers include those described by structure (III):

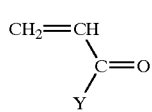

(III)

where Y is selected from the group consisting of —NR$^3_2$, —O—R$^5$—O—C(=O)—NR$^3_2$, and —OR$^4$, R$^3$ is selected from the group consisting of H, linear or branched $C_1$ to $C_{20}$ alkyl, and linear or branched $C_1$ to $C_{20}$ alkylol, R$^4$ is selected from the group consisting of H, poly(ethylene oxide), poly(propylene oxide), linear or branched $C_1$ to $C_{20}$ alkyl, alkylol, aryl and aralkyl, linear or branched $C_1$ to $C_{20}$ fluoroalkyl, fluoroaryl and fluoroaralkyl, a siloxane radical, a polysiloxane radical, an alkyl siloxane radical, an ethoxylated trimethylsilyl siloxane radical, and a propoxylated trimethylsilyl siloxane radical. A particularly useful type of acrylic acceptor monomers are those described by structure III where Y includes at least one functional group of epoxy, oxirane, carboxylic acid, hydroxy, amide, oxazoline, aceto acetate, isocyanate, or carbamate, and R$^5$ is a divalent linear or branched $C_1$ to $C_{20}$ alkyl linking group.

Examples of suitable acceptor monomers that may be used in the present invention include, but are not limited to, hydroxyethyl acrylate, hydroxypropyl acrylate, acrylic acid, methyl acrylate, ethyl acrylate, butyl acrylate, isobutyl acrylate, isobornyl acrylate, glycidyl acrylate, dimethylaminoethyl acrylate, acrylamide, perfluoro methyl ethyl acrylate, perfluoro ethyl ethyl acrylate, perfluoro butyl ethyl acrylate, trifluoromethyl benzyl acrylate, perfluoro alkyl ethyl, acryloxyalkyl terminated polydimethylsiloxane, acryloxyalkyl tris(trimethylsiloxy silane), acryloxyalkyl trimethylsiloxy terminated polyethylene oxide, chlorotrifluoro ethylene, glycidyl acrylate, 2-ethylhexyl acrylate, and n-butoxy methyl acrylamide.

The acrylic acceptor monomers of structure III are present in the copolymer composition at a level of at least 15 mol %, in some cases at least 25 mol %, typically at least 30 mol %, and, in some cases, at least 35 mol %. The acrylic acceptor monomers of structure III are present in the copolymer composition at a level of up to 50 mol %, in some cases up to 47.5 mol %, typically up to 45 mol %, and, in some cases, up to 40 mol %. The level of the acrylic acceptor monomers of structure III used is determined by the properties that are to be incorporated into the copolymer composition. Residues from the acrylic acceptor monomers of structure III may be present in the copolymer composition in any range of values inclusive of those stated above.

Suitable other mild acceptor monomers that may be used in the present invention include, but are not limited to, acrylonitrile, methacrylonitrile, vinyl halides, crotonic acid, vinyl alkyl sulfonates, and acrolein. Vinyl halides include, but are not limited to, vinyl chloride and vinylidene fluoride. The use of other mild acceptor monomers is optional, when other mild acceptor monomers are present, they are present at a level of at least 0.01 mol % of the copolymer composition, often at least 0.1 mol %, typically at least 1 mol %, and, in some cases, at least 2 mol %. The other acceptor monomers may be present at up to 35 mol %, in some cases up to 25 mol %, typically up to 15 mol %, and, in some cases, up to 10 mol %. The level of other acceptor monomers used is determined by the properties that are to be incorporated into the copolymer composition. Residues from the other acceptor monomers may be present in the copolymer composition in any range of values inclusive of those stated above.

The present copolymer has a molecular weight of at least 250, in many cases at least 500, typically at least 1,000, and, in some cases, at least 2,000. The present copolymer may have a molecular weight of up to 1,000,000, in many cases up to 500,000, typically up to 100,000, and, in some cases, up to 50,000. Certain applications will require that the molecular weight of the present copolymer not exceed 25,000, in some cases not to exceed 20,000, and, in certain instances not to exceed 16,000. The molecular weight of the copolymer is selected based on the properties that are to be incorporated into the copolymer composition. The molecular weight of the copolymer may vary in any range of values inclusive of those stated above.

The polydispersity index (PDI) of the present copolymer is not always critical. The polydispersity index of the copolymer is usually less than 4, in many cases less than 3.5, typically less than 3.0, and, in some cases, less than 2.5. As used herein and in the claims, "polydispersity index" is determined from the following equation: (weight average molecular weight (Mw)/number average molecular weight (Mn)) A monodisperse polymer has a PDI of 1.0. Further, as used herein, Mn and Mw are determined from gel permeation chromatography using polystyrene standards.

In an embodiment of the present copolymer composition, the alternating sequences of donor monomer—acceptor monomer pairs are residues having the alternating structure IV:

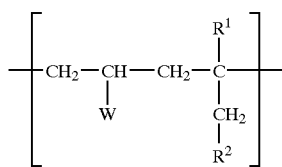

(IV)

where $R^1$, $R^2$, and W are defined as above. A particularly preferred embodiment is one wherein the monomer residues containing the group W are derived from one or more acrylic monomers and the monomer residues containing the groups $R^1$ and $R^2$ are derived from diisobutylene and/or isobutylene. The copolymer compositions of the present invention may also include other polymerizable ethylenically unsaturated monomers.

The copolymer composition of the present invention may have all of the incorporated monomer residues in an alternating architecture. A non-limiting example of a copolymer segment having 100% alternating architecture of diisobutylene (DIIB) and an acrylic monomer (Ac) is shown by structure V:

-Ac-DIIB-Ac-DIIB-Ac-DIIB-Ac-DIIB-Ac-DIIB-Ac-DIIB-Ac- (V)

However, in most instances, the present copolymer will contain alternating segments and random segments as shown by structure VI, a copolymer of DIIB, Ac and other monomers, M:

shown in the boxes and random segments as shown by the underlined segments.

The random segments of the copolymer may contain donor or acceptor monomer residues that have not been incorporated into the copolymer composition by way of an alternating architecture. The random segments of the copolymer composition may further include residues from other ethylenically unsaturated monomers. As recited herein, all references to polymer segments derived from alternating sequences of donor monomer—acceptor monomer pairs are meant to include segments of monomer residues such as those shown by the boxes in structure VI.

The other ethylenically unsaturated monomers include any suitable monomer not traditionally categorized as being an acceptor monomer or a donor monomer.

The other ethylenically unsaturated monomers, residue M of structure VI, is derived from at least one ethylenically unsaturated radically polymerizable monomer. As used herein and in the claims, "ethylenically unsaturated radically polymerizable monomer" and like terms are meant to include vinyl monomers, allylic monomers, olefins, and other ethylenically unsaturated monomers that are radically polymerizable and not classified as donor monomers or acceptor monomers.

Classes of vinyl monomers from which M may be derived include, but are not limited to, methacrylic monomers and allylic monomers. Residue M may be derived from at least one of alkyl methacrylate having from 1 to 20 carbon atoms in the alkyl group. Specific examples of alkyl methacrylates having from 1 to 20 carbon atoms in the alkyl group from which residue M may be derived include, but are not limited to, methyl methacrylate, ethyl methacrylate, propyl methacrylate, isopropyl methacrylate, butyl methacrylate, isobutyl methacrylate, tert-butyl methacrylate, 2-ethylhexyl methacrylate, lauryl methacrylate, isobornyl methacrylate, cyclohexyl methacrylate, 3,3,5-trimethylcyclohexyl methacrylate, as well as functional methacrylates, such as hydroxyalkyl methacrylates, oxirane functional methacrylates, and carboxylic acid functional methacrylates.

Residue M may also be selected from monomers having more than one methacrylate group, for example, methacrylic anhydride and diethyleneglycol bis(methacrylate).

As used herein and in the claims, by "allylic monomer(s)" what is meant is monomers containing substituted and/or unsubstituted allylic functionality, i.e., one or more radicals represented by the following general formula VII,

H2C=C(R$^{10}$)—CH$_2$— (VII)

where $R^{10}$ is hydrogen, halogen, or a $C_1$ to $C_4$ alkyl group. Most commonly, $R^{10}$ is hydrogen or methyl and consequently general formula VII represents the unsubstituted (meth)allyl radical, which encompasses both allyl and methallyl radicals. Examples of allylic monomers include, but are not limited to, (meth)allyl alcohol; (meth)allyl ethers, such as methyl (meth)allyl ether; allyl esters of carboxylic acids, such as (meth)allyl acetate, (meth)allyl butyrate, (meth)allyl 3,4-dimethoxybenzoate, and (meth)allyl benzoate.

(VI)

Alternating  Alternating

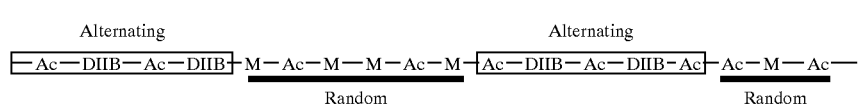 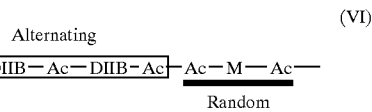

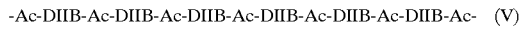
Random Random

Structure VI shows an embodiment of the present invention where the copolymer may include alternating segments as The present copolymer composition is prepared by a method including the steps of (a) providing a donor monomer composition comprising one or more donor monomers of structure (I), and (b) adding an ethylenically unsaturated monomer composition comprising one or more acceptor monomers. In an embodiment of the present invention, the ethylenically unsaturated monomer composition includes monomers of structure III. The ethylenically unsaturated monomer composition is added to the donor monomer composition in the presence of a free radical polymerization initiator in a suitable reaction vessel. The monomer solutions and resulting copolymer composition are substantially free of maleate-type monomers, fumarate-type monomers, Lewis acids, and transition metals.

In an embodiment of the present method, the monomer of structure I is present at a molar excess based on the amount of acrylic acceptor monomer. Any amount of excess monomer of structure I may be used in the present invention in order to encourage the formation of the desired alternating architecture. The excess amount of monomer of structure I may be at least 10 mol %, in some cases up to 25 mol %, typically up to 50 mol %, and, in some cases, up to 100 mol % based on the amount of acrylic acceptor monomer. When the molar excess of monomer of structure I is too high, the process may not be economical on a commercial scale.

In a further embodiment of the present method, the acrylic acceptor monomer is present in an amount of at least 15 mol %, in some cases 17.5 mol %, typically at least 20 mol % and, in some cases, 25 mol % of the total of the combined donor monomer composition and the ethylenically unsaturated monomer composition. The acrylic acceptor monomer may further be present in an amount up to 50 mol %, in some cases up to 47.5 mol %, typically up to 45 mol %, and, in some cases, up to 40 mol % of the total of the combined donor monomer composition and the ethylenically unsaturated monomer composition. The level of the acrylic acceptor monomers used is determined by the properties that are to be incorporated into the copolymer composition. The acrylic acceptor monomers may be present in the monomer composition in any range of values inclusive of those stated above.

The ethylenically unsaturated monomer composition of the present method may include other donor monomers as described above, as well as other monomers designated by M and described above. The use of other mild acceptor monomers is optional in the present method. When other mild acceptor monomers are present, they are present at a level of at least 0.01 mol % of the copolymer composition, often at least 0.1 mol %, typically at least 1 mol %, and, in some cases, at least 2 mol %. The other acceptor monomers may be present at up to 35 mol %, in some cases up to 25 mol %, typically up to 15 mol %, and, in some cases, up to 10 mol %. The level of other acceptor monomers used herein is determined by the properties that are to be incorporated into the copolymer composition. Residues from the other acceptor monomers may be present in the copolymer composition in any range of values inclusive of those stated above.

The use of other monomers, M, is optional in the present method. When other monomers are present, they are present at a level of at least 0.01 mol % of the copolymer composition, often at least 0.1 mol %, typically at least 1 mol %, and, in some cases, at least 2 mol %. The other monomers may be present at up to 35 mol %, in some cases up to 25 mol %, typically up to 15 mol %, and, in some cases, up to 10 mol %. The level of other monomers used herein is determined by the properties that are to be incorporated into the copolymer composition. Residues from the other monomers, M, may be present in the copolymer composition in any range of values inclusive of those stated above.

In an embodiment of the present method, an excess of monomer of structure I is used and the unreacted monomer of structure I is removed from the resulting copolymer composition by evaporation. The removal of unreacted monomer is typically facilitated by the application of a vacuum to the reaction vessel.

Any suitable free radical initiator may be used in the present invention. Examples of suitable free radical initiators include, but are not limited to, thermal free radical initiators, photo-initiators, and redox initiators. Examples of suitable thermal free radical initiators include, but are not limited to, peroxide compounds, azo compounds, and persulfate compounds.

Examples of suitable peroxide compound initiators include, but are not limited to, hydrogen peroxide, methyl ethyl ketone peroxides, benzoyl peroxides, di-t-butyl peroxide, di-t-amyl peroxide, dicumyl peroxide, diacyl peroxides, decanoyl peroxides, lauroyl peroxides, peroxydicarbonates, peroxyesters, dialkyl peroxides, hydroperoxides, peroxyketals, and mixtures thereof.

Examples of suitable azo compounds include, but are not limited to, 4-4'-azobis(4-cyanovaleric acid), 1-1'-azobiscyclohexanecarbonitrile), 2-2'-azobisisobutyronitrile, 2-2'-azobis(2-methylpropionamidine)dihydrochloride, 2-2'-azobis(2-methylbutyronitrile), 2-2'-azobis(propionitrile), 2-2'-azobis(2,4-dimethylvaleronitrile), 2-2'-azobis (valeronitrile), 2,2'-azobis[2-methyl-N-(2-hydroxyethyl) propionamide], 4,4'-azobis(4-cyanopentanoic acid), 2,2'-azobis(N,N'-dimethyleneisobutyramidine), 2,2'-azobis(2-amidinopropane)dihydrochloride, 2,2'-azobis(N,N'-dimethyleneisobutyramidine)dihydrochloride, and 2-(carbamoylazo)-isobutyronitrile.

In an embodiment of the present invention, the ethylenically unsaturated monomer composition and the free radical polymerization initiator are separately and simultaneously added to and mixed with the donor monomer composition. The ethylenically unsaturated monomer composition and the free radical polymerization initiator may be added to the donor monomer composition over a period of at least 15 minutes, in some cases at least 20 minutes, typically at least 30 minutes, and, in some cases, at least 1 hour. The ethylenically unsaturated monomer composition and the free radical polymerization initiator may further be added to the donor monomer composition over a period of up to 24 hours, in some cases up to 18 hours, typically up to 12 hours, and, in some cases, up to 8 hours. The time for adding the ethylenically unsaturated monomer must be sufficient to maintain a suitable excess of donor monomer of structure I over unreacted acrylic acceptor monomer to encourage the formation of donor monomer—acceptor monomer alternating segments. The addition time is not so long as to render the process economically unfeasible on a commercial scale. The addition time may vary in any range of values inclusive of those stated above.

After mixing or during addition and mixing, polymerization of the monomers takes place. The present polymerization method can be run at any suitable temperature. Suitable temperature for the present method may be ambient, at least 50° C., in many cases at least 60° C, typically at least 7520 C., and, in some cases, at least 100° C. Suitable temperature for the present method may further be described as being up to 300° C, in many cases up to 275° C, typically up to 250° C, and, in some cases, up to 225° C. The temperature is typically high enough to encourage good reactivity from the monomers and initiators employed. However, the volatility of the monomers and corresponding partial pressures create a practical upper limit on temperature determined by the pressure rating of the reaction vessel. The polymerization temperature may vary in any range of values inclusive of those stated above.

The present polymerization method can be run at any suitable pressure. A suitable pressure for the present method may be ambient, at least 1 psi, in many cases at least 5 psi, typically at least 15 psi, and, in some cases, at least 20 psi. Suitable pressures for the present method may further be described as being up to 200 psi, in many cases up to 175 psi, typically up to 150 psi, and, in some cases, up to 125 psi. The pressure is typically high enough to maintain the monomers and initiators in a liquid phase. The pressures employed have a practical upper limit based on the pressure rating of the reaction vessel employed. The pressure during polymerization temperature may vary in any range of values inclusive of those stated above.

The copolymer that results from the present method may be utilized as a starting material for the preparation of other polymers by using functional group transformations by methods known in the art. Functional groups that can be introduced by these methods are epoxy, carboxylic acid, hydroxy, amide, oxazoline, acetoacetate, isocyanate, carbamate, amine, amine salt, quaternary ammonium, thioether, sulfide, sulfonium and phosphate.

For example, a copolymer of the present method comprising methyl acrylate will contain carbomethoxy groups. The carbomethoxy groups can be hydrolyzed to carboxyl groups or transesterified with an alcohol to form the corresponding ester of the alcohol. Using ammonia, the aforementioned methyl acrylate copolymer can be converted to an amide, or, using a primary or secondary amine, can be converted to the corresponding N-substituted amide. Similarly, using a diamine such as ethylene diamine, one can convert the aforementioned copolymer of the present method to an N-aminoethylamide, or, with ethanolamine, to an N-hydroxyethylamide. The N-aminoethylamide functionality can be further converted to an oxazoline by dehydration. The N-aminoethylamide can be further reacted with a carbonate such as propylene carbonate to produce the corresponding urethane functional copolymer. These transformations can be carried out to convert all of the carbomethoxy groups or can be carried out in part, leaving some of the carbomethoxy groups intact.

Epoxy groups can be introduced into the copolymer of the present method directly by using glycidyl acrylate in the copolymer preparation or indirectly by functional group transformation. One example of an indirect method is to oxidize residual unsaturation in the copolymer to epoxy groups using a peracid such as peroxyacetic acid. Alternatively one can prepare a carboxyl-functional copolymer by hydrolysis as described above, treat the carboxyl-functional copolymer with epichlorohydrin then alkali to produce the epoxy functional copolymer. These transformations can also be carried out exhaustively or in part. The resulting epoxy-functional copolymer can be further reacted with the appropriate active hydrogen containing reagents to form alcohols, amines or sulfides.

Hydroxyl groups can be introduced directly using a hydroxyl-functional monomer such as hydroxyethyl acrylate in the copolymer of the present method, or they can be introduced by functional group transformation. By treating the carboxyl-functional copolymer described above with an epoxy one can produce a hydroxyl functional polymer. Suitable epoxies include, but are not limited to, ethylene oxide, propylene oxide, butylene oxide and glycidyl neodecanoate.

The above-described hydroxyl functional copolymers can be further reacted to form other copolymers. For example, a copolymer containing hydroxyethyl groups can be treated with a carbamylating agent, such as methyl carbamate, to produce the corresponding carbamate functional copolymer. With diketene or t-butyl acetoacetate the hydroxyl groups can also be converted to acetoacetate esters.

Isocyanate functional copolymers can also be produced. Copolymers of the present method, which contain 2 or more hydroxyl groups, can be treated with a diisocyanate such as isophoronediisocyanate to produce isocyanate-functional polymers. Primary amine functional copolymers, described above, can be phosgenated to produce isocyanate functionality.

Ionic functionality can be incorporated into the copolymer of the present method by any means known in the art. Carboxylate groups can be introduced by hydrolysis of ester groups in the copolymer followed by reaction with base. Amine salts can be introduced by preparing the present copolymer with an amine functional acrylate, such as dimethylaminoethyl acrylate, followed by protonation of the amino groups with an acid. Amine salts can also be introduced by reacting a glycidyl functional copolymer with ammonia or an active hydrogen containing amine followed by protonation with acid. Quaternary amine functional groups or ternary sulfonium groups can be introduced into the copolymer by treating an epoxy functional copolymer of the present method with a tertiary amine or sulfide, respectively, in the presence of a protic acid.

The present invention is further directed to a thermosetting coating composition. The thermosetting coating composition of the present invention may be in the form of liquid coating compositions, examples of which include aqueous and solvent-based coating compositions and electrodepositable coating compositions. The present thermosetting coating composition may also be in the form of a co-reactable solid in particulate form, such as a powder coating composition. Regardless of the form, the present thermosetting coating composition may be pigmented or clear, and may be used alone or in combination as primers, basecoats, or topcoats.

The present thermosetting composition includes (a) a first reactant comprising functional groups, (b) a crosslinking agent having at least two functional groups that are reactive with the functional groups first reactant in (a), and (c) a copolymer flow control agent, which is the copolymer composition of the present invention.

In an embodiment of the present invention, the coating composition is a co-reactable solid, particulate mixture of (a), (b), and (c). In this embodiment, the present curable powder coating compositions will typically comprise (a) a first reactant having functional groups, for example an epoxide functional polymer reactant, (b) a second reactant that is a crosslinking agent having functional groups that are co-reactive towards and can form covalent bonds with the functional groups of the first reactant, and (c) the copolymer composition of the present invention as a copolymer flow control additive. The first and second reactants of the curable powder coating composition may each independently comprise one or more functional species, and are each present in amounts sufficient to provide cured coatings having a desirable combination of physical properties, such as smoothness, clarity, solvent resistance and hardness.

Not wishing to be limited to any one set of functional groups, there are several examples of co-reactive functional groups that can be used in the present invention. The functional groups of the first reactant can be, but are not limited to, epoxy or oxirane, carboxylic acid, hydroxy, amide, oxazoline, aceto acetate, isocyanate, methylol, methylol ether, or carbamate.

The second or crosslinking reactant has a functional group different than that contained in the first reactant and is co-reactive toward the functional groups of the first reactant and can be, but is not limited to, epoxy or oxirane, carboxylic acid, hydroxy, isocyanate, capped isocyanate, amine, methylol, methylol ether, and beta-hydroxyalkylamide.

One example of curable coating compositions from which the compositions of the present invention may include an epoxide functional polymer as the first reactant and an epoxide reactive crosslinking agent, such as a carboxylic acid functional crosslinking agent, as the second reactant. Examples of this type of coating are disclosed in U.S. Pat. Nos. 5,407,707, 5,663,240, and 5,710,214. Yet another example is a coating composition comprising a carbamate functional polymer as the first reactant (a) and an aminoplast crosslinking agent as the second reactant, such as those described in U.S. Pat. Nos. 5,976,701, 5,989,642, and 6,111,001.

Another example is a coating composition comprising a carboxylic acid functional polymer as the first reactant and a beta-hydroxyalkylamide functional crosslinking agent as the second reactant, such as those disclosed in U.S. Pat. Nos. 4,889,890, 4,937,288, 5,098,955, 5,202,382, and 5,214,101.

A further example is a coating composition comprising a hydroxy functional polymer as the first reactant and a capped isocyanate functional crosslinking agent as the second reactant, such as those described in U.S. Pat. Nos. 4,997,900, 5,439,896, 5,508,337, 5,510,444, 5,554,692, and 5,777,061.

Polymers comprising the majority of the binder resins in curable powder coating compositions are solid at room temperature, typically having differential scanning calorimetry (DSC) derived glass transition midpoint values of from 30° C. to 80° C., preferably from 35° C. to 50° C. These polymers also typically have number average molecular weights (Mn) of from 500 to 15,000.

Classes of epoxide functional polymers from which the first reactant of the curable coating compositions of the present invention may be selected include, but are not limited to, epoxide functional vinyl polymers, of which epoxide functional acrylic polymers, epoxide functional methacrylic polymers, epoxide functional polyethers, epoxide functional polyesters, and combinations thereof, are included. Epoxide functional vinyl polymers can be prepared by free radical polymerization methods that are known to those of ordinary skill in the art. Such known free radical polymerization methods typically make use of suitable initiators, which include organic peroxides and azo type compounds and chain transfer agents, such as alpha-methyl styrene dimer and tertiary dodecyl mercaptan.

Epoxide functional vinyl polymers are typically prepared by polymerizing one or more epoxide functional ethylenically unsaturated monomers, such as methyl acrylate, methyl (meth)acrylate, isobornyl acrylate, isobornyl (meth)acrylate, butyl acrylate, butyl (meth)acrylate and styrene. Examples of epoxide functional ethylenically unsaturated monomers that may be used in the preparation of epoxide functional vinyl polymers include, but are not limited to, glycidyl acrylate, glycidyl (meth)acrylate, 3,4-epoxycyclohexylmethyl acrylate, 3,4-epoxycyclohexylmethyl (meth)acrylate, 2-(3,4-epoxycyclohexyl)ethyl acrylate, 2-(3,4-epoxycyclohexyl)ethyl (meth)acrylate, and allylglycidyl ether. Examples of ethylenically unsaturated monomers that are free of epoxide functionality include those described in U.S. Pat. No. 5,407,707 at column 2, lines 17–56.

In a preferred embodiment of the present invention, the epoxide functional vinyl polymer is prepared from a majority of acrylate and (meth)acrylate monomers and is referred to herein as an "epoxide functional (meth)acrylic polymer." The epoxide functional vinyl polymer typically has a number average molecular weight of from 500 to 5,000, preferably from 800 to 2,500.

Epoxide functional polyethers can be prepared from a hydroxyl functional monomer, such as a diol, and an epoxide functional monomer, and/or a monomer having both hydroxy and epoxide functionality. Suitable epoxide functional polyethers include, but are not limited to, those based on 4,4'-isopropylidenediphenol (Bisphenol A), a specific example of which is EPON® RESIN 2002 available commercially from Shell Chemicals.

Epoxide functional polyesters can be prepared by art-recognized methods, which typically include first preparing a hydroxyl functional polyester that is then reacted with epichlorohydrin. Polyesters having hydroxyl functionality may be prepared by art-recognized methods, which include reacting carboxylic acids (and/or esters thereof) having acid (or ester) functionalities of at least 2, and polyols having hydroxyl functionalities of at least 2. As is known to those of ordinary skill in the art, the molar equivalents ratio of carboxylic acid groups to hydroxyl groups of the reactants is selected such that the resulting polyester has hydroxy functionality and the desired molecular weight.

Examples of multifunctional carboxylic acids useful in preparing hydroxyl functional polyesters are known to the skilled artisan and include, for example, phthalic acid, tetrahydrophthalic acid, hexahydrophthalic acid, isophthalic acid, and terephthalic acid. Examples of polyols useful in preparing hydroxy functional polyesters are known to those skilled in the art and include, for example, glycerin, trimethylolpropane, ethylene glycol, and 1,4-dimethylolcyclohexane.

Epoxide reactive crosslinking agents that are used in thermosetting coating compositions comprising epoxide functional polymers may have functional groups selected from hydroxyl, thiol, primary amines, secondary amines, carboxyl and mixtures thereof. Useful epoxide reactive crosslinking agents having amine functionality include, for example, dicyandiamide and substituted dicyandiamides. Preferably, the epoxide reactive crosslinking agent has carboxylic acid groups. In one embodiment of the present invention, the epoxide reactive crosslinking agent has carboxylic acid functionality and is substantially crystalline. By "crystalline" is meant that the co-reactant contains at least some crystalline domains and correspondingly may contain some amorphous domains. While not necessary, it is preferred that the epoxide reactive crosslinking agents have a melt viscosity less than that of the epoxy functional polymer (at the same temperature). As used herein, by "epoxide reactive crosslinking agent" is meant that the epoxide reactive crosslinking agent has at least two functional groups that are reactive with epoxide functionality.

Other suitable carboxylic acid functional crosslinking agents include those represented by the following general formula VIII:

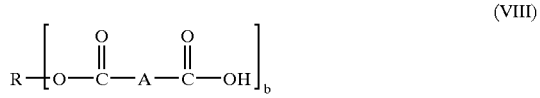

(VIII)

where R is a residue from a polyol, A is a divalent linking group having from 1 to 10 carbon atoms, and b is an integer of from 2 to 10. Examples of polyols from which R of general formula VIII may be derived include, but are not limited to ethylene glycol, di(ethylene glycol), trimethylolethane, trimethylolpropane, pentaerythritol, di-trimethylolpropane, di-pentaerythritol, and mixtures thereof. Divalent linking groups from which A may be selected include, but are not limited to, methylene, ethylene, propylene, isopropylene, butylene, pentylene, hexylene, heptylene, octylene, nonylene, decylene, cyclohexylene, such as 1,2-cyclohexylene, substituted cyclohexylene, such as 4-methyl-1,2-cyclohexylene, phenylene, such as 1,2-phenylene; and 4-carboxylic acid-1,2-phenylene. The divalent linking group A is preferably aliphatic.

The crosslinking agent represented by general formula VIII is typically prepared from a polyol and a dibasic or cyclic anhydride. For example, trimethylol propane and hexahydro-4-methylphthalic anhydride are reacted together in a molar ratio of 1:3 respectively to form a carboxylic acid functional crosslinking agent. This particular crosslinking agent can be described with reference to general formula VIII as follows, R is the residue of trimethylol propane, A is the divalent linking group 4-methyl-1,2-cyclohexylene, and b is 3. Carboxylic acid functional crosslinking agents described herein with reference to general formula VIII are meant to include also any unreacted starting materials and/or co-products, for example oligomeric species, resulting from their preparation and contained therein.

Curable coating compositions comprising epoxide functional polymer and epoxide reactive crosslinking agent usually also include one or more cure catalysts for catalyzing the reaction between the reactive functional groups and the epoxide groups of the polymer. Examples of cure catalysts for use with acid functional crosslinking agents include tertiary amines, such as methyl dicocoamine, and tin compounds, such as triphenyl tin hydroxide. The curing catalyst is typically present in the curable coating composition in an amount of less than 5 percent by weight, preferably from 0.25 to 2.0 percent by weight, based on the total resin solids weight of the composition.

Curable coating compositions that include epoxide functional polymers and epoxide reactive crosslinking agents typically have present therein epoxide functional polymers in an amount of from 60 to 95 percent by weight based on the total resin solids weight of the composition, typically from 70 to 85 percent by weight, based on the total resin solids weight composition. The epoxide reactive crosslinking agent is typically present in the curable coating composition in an amount corresponding to the balance of these recited ranges, 5 to 40, typically 15 to 30 percent by weight. The equivalent ratio of epoxide equivalents in the epoxide functional polymer to the equivalents of reactive functional groups is typically from 0.5:1 to 2:1, in many cases from 0.8:1 to 1.5:1. Curable coating compositions which include carboxylic acid functional crosslinking agents are typically cured at a temperature of from 121° C. to 177° C. over a period of from 10 to 60 minutes.

Curable coating compositions comprising carboxylic acid functional polymer as the first reactant (a) and beta-hydroxyalkylamide functional crosslinking agent as the second reactant (b) are also useful in the present invention. Classes of useful carboxylic acid functional polymers include, but are not limited to, carboxylic acid functional vinyl polymers, carboxylic acid functional polyesters, carboxylic acid functional polyurethanes, and mixtures thereof.

Carboxylic acid functional vinyl polymers can be prepared by free radical polymerization methods that are known to those of ordinary skill in the art, for example, free radical polymerization methods as described previously herein. The carboxylic acid functional vinyl polymer is typically prepared by polymerizing one or more carboxylic acid functional ethylenically unsaturated monomers, such as acrylic acid and methacrylic acid, with one or more ethylenically unsaturated monomers that are free of carboxylic acid functionality, such as ethyl acrylate, ethyl methacrylate, isobornyl acrylate, isobornyl methacrylate, butyl acrylate, butyl methacrylate, and styrene. Alternatively, the carboxylic acid functional vinyl polymer may be one that is reacted with a cyclic anhydride, such as succinic anhydride, after polymerization. Carboxylic vinyl polymers, such as acrylic and methacrylic polymers, useful in the present invention are described in further detail in U.S. Pat. No. 4,937,288, column 4, line 18 through column 6, line 12.

Carboxylic acid functional polyurethanes may be prepared by-reacting polyols and polyisocyanates so as to form a polyurethane polyol, which is then reacted with polycarboxylic acid or cyclic anhydride to introduce free carboxylic acid into the reaction product. Carboxylic functional polyurethane that may be used in the curable coating compositions, which include beta-hydroxyalkylamide crosslinking agents are described in further detail in U.S. Pat. No. 4,937,288 at column 6, lines 13–39.

One or more beta-hydroxyalkylamide crosslinking agents may be present in the curable coating compositions comprising carboxylic acid functional polymer as the first reactant. The beta-hydroxyalkylamide crosslinking agent can be represented by the following general formula IX:

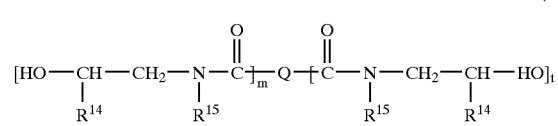

(IX)

wherein $R^{14}$ is H or $C_1$ to $C_5$ alkyl, $R^{15}$ is H or $C_1$ to $C_5$ alkyl or a structure as defined by structure X:

(X)

for which $R^{14}$ is as described above, Q is a chemical bond or monovalent or polyvalent organic radical derived from saturated, unsaturated, or aromatic hydrocarbon radicals including substituted hydrocarbon radicals containing from 2 to 20 carbon atoms, m equals 1 or 2, t equals 0 to 2, and m=t is at least 2. Preferably, Q is an alkylene radical —(CH$_2$)x— where x is equal to 2 to 12, preferably 4 to 10; m is equal to 1 to 2, t is equal to 0 to 2, and m+t is at least 2, preferably greater than 2 up to and including 4. The beta-hydroxyalkylamide crosslinking agent represented by general formula IX can be prepared by art recognized methods, as described in, for example, U.S. Pat. No. 4,937,288 at column 7, lines 6–16.

Curable coating compositions comprising carboxylic acid functional polymer and beta-hydroxyalkylamide crosslinking agent typically have present therein carboxylic acid functional polymer in an amount of from 60 to 95 percent by weight, based on total resin solids weight of the composition, preferably from 80 to 90 percent by weight, based on total resin solids weight of the composition. The beta-hydroxyalkylamide crosslinking agent is typically present in the curable coating composition in an amount corresponding to the balance of the recited ranges, 5 to 40, preferably 10 to 20 percent by weight.

To achieve a suitable level of cure, the equivalent ratio of hydroxy equivalents in the beta-hydroxyalkylamide crosslinking agent to carboxylic acid equivalents in the carboxylic acid functional polymer is preferably from 0.6:1 to 1.6:1, preferably from 0.8:1 to 1.3:1. Ratios outside the range of 0.6:1 to 1.6:1 are generally undesirable due to the resulting poor cure response associated therewith. Curable coating compositions comprising carboxylic acid functional polymer and beta-hydroxyalkylamide functional crosslinking agent are typically cured at a temperature of from 149° C. to 204° C. over a period of from 10 to 60 minutes.

Also useful in the present invention are curable coating compositions comprising hydroxy functional polymer and capped isocyanate functional crosslinking agent. Hydroxy functional polymers that can be used in such compositions include, but are not limited to, hydroxy functional vinyl polymers, hydroxy functional polyesters, hydroxy functional polyurethanes, hydroxy functional polyethers and mixture thereof.

Vinyl polymers having hydroxy functionality can be prepared by free radical polymerization methods that are known to those of ordinary skill in the art, for example, as described in U.S. Pat. No. 5,508,337, column 3, line 15 through column 5, line 23. In an embodiment of the present invention, the hydroxy functional vinyl polymer is prepared from a majority of acrylic and/or (meth)acrylic monomers and is referred to herein as a "hydroxy functional (meth) acrylic polymer."

Hydroxy functional polyesters useful in curable coating compositions comprising a capped isocyanate functional crosslinking agent can be prepared by art-recognized methods. Typically, diols and dicarboxylic acids or diesters of dicarboxylic acids are reacted in a proportion such that the molar equivalents of hydroxy groups is greater than that of carboxylic acid groups (or esters of carboxylic acid groups) with the concurrent removal of water or alcohols from the reaction medium. Hydroxy functional polyesters useful in the present invention are described in further detail in U.S. Pat. No. 5,508,337 at column 5, line 24 through column 6, line 30.

Hydroxy functional urethanes can be prepared by art recognized methods, for example, as previously described herein. Hydroxy functional urethanes useful in the present invention are described in further detail in U.S. Pat. No. 5,510,444 at column 5, line 33 through column 7, line 61.

By "capped isocyanate crosslinking agent" is meant a crosslinking agent having two or more capped isocyanate groups that can decap (or deblock) under cure conditions, for example, at an elevated temperature, to form free isocyanate groups and free capping groups. The free isocyanate groups formed by decapping of the crosslinking agent are preferably capable of reacting and forming substantially permanent covalent bonds with the hydroxy groups of hydroxy functional polymer.

It is desirable that the capping group of the capped isocyanate crosslinking agent not adversely affect the curable coating composition upon decapping from the isocyanate, for example when it becomes a free capping group. For example, it is desirable that the free capping group neither become trapped in the cured film as gas bubbles nor excessively plasticize the cured film. Capping groups useful in the present invention preferably have the characteristics of being nonfugitive or capable of escaping substantially from the forming coating prior to its vitrification.

Classes of capping groups of the capped isocyanate crosslinking agent may be selected from hydroxy functional compounds, such as ethylene glycol butyl ether, phenol, and p-hydroxy methylbenzoate, 1H-azoles, such as 1H-1,2,4-triazole and 1H-2,5-dimethyl pyrazole, lactams, such as e-caprolactam and 2-pyrolidone, ketoximes, such as 2-propane oxime and 2-butanone oxime, and those described in U.S. Pat. No. 5,508,337 at column 7, lines 11–22, the disclosure of which is incorporated herein by reference. Other capping groups include morpholine, 3-aminopropyl morpholine, and n-hydroxy phthalimide.

The isocyanate or mixture of isocyanates of the capped isocyanate crosslinking agent has two or more isocyanate groups and is preferably solid as room temperature. Examples of suitable isocyanates that may be used to prepare the capped isocyanate crosslinking agent include monomeric diisocyanates, such as α,α'-xylene diisocyanate, α, α, α', α'-tetramethylxylylene diisocyanate and 1-isocyanato-3-isocyanatomethyl-3,5,5-trimethylcyclohexane (isophorone diisocyanate or IPDI), and dimers and trimers of monomeric diisocyanates containing isocyanurate, uretidino, biuret or allophanate linkages, such as the trimer of IPDI. Isocyanates that are useful in the present invention are described in further detail in U.S. Pat. No. 5,777,061 at column 3, line 4 through column 4, line 40, the disclosure of which is incorporated herein by reference. A particularly preferred isocyanate is a trimer of 1-isocyanato-3,3,5-trimethyl-5-isocyanatomethylcyclohexane.

The capped isocyanate crosslinking agent may also be selected from oligomeric capped isocyanate functional adducts. As used herein, by "oligomeric capped polyisocyanate functional adduct" is meant a material that is substantially free of polymeric chain extension. Oligomeric capped polyisocyanate functional adducts can be prepared by art-recognized methods from, for example, a compound containing three or more active hydrogen groups, such as trimethylolpropane (TMP), and an isocyanate monomer, such as 1-isocyanato-3,3,5-trimethyl-5-isocyanatomethylcyclohexane (IPDI) in a molar ratio of 1:3 respectively. In the case of TMP and IPDI, by employing art-recognized starved feed and/or dilute solution synthesis techniques, an oligomeric adduct having an average isocyanate functionality of 3 can be prepared ("TMP-3IPDI"). The three free isocyanate groups per TMP-3IPDI adduct are then capped with a capping group, such as 2-propane oxime or e-caprolactam.

To catalyze the reaction between the isocyanate groups of the capped polyisocyanate crosslinking agent and the hydroxy groups of the hydroxy functional polymer, one or more catalysts are typically present in the coating composition in amounts of from, for example, 0.1 to 5 percent by weight, based on total resin solids of the composition. Classes of useful catalysts include, metal compounds, in particular, organic tin compounds, such as tin(II) octanoate and dibutyltin(IV) dilaurate, and tertiary amines, such as diazabicyclo[2.2.2]octane. Examples of organic tin compounds and tertiary amines are described in U.S. Pat. No. 5,508,337 at column 7, lines 28–49, the disclosure of which is incorporated herein by reference.

Curable coating compositions of the present invention include those where the first reactant is selected from acid functional polyesters and the second reactant is a glycidyl isocyanurate and/or a bisphenol A epoxide.

Curable coating compositions comprising hydroxy functional polymer and capped isocyanate functional crosslinking agent, typically have present therein hydroxy functional polymer in an amount of from 55 to 95 percent by weight, based on total resin solids weight of the composition, preferably from 75 to 90 percent by weight based on total resin solids weight of the composition. The capped isocyanate functional crosslinking agent is typically present in the composition in an amount corresponding to the balance of these recited ranges, 5 to 45, preferably 10 to 25 percent by weight.

The equivalent ratio of isocyanate equivalents in the capped isocyanate crosslinking agent to hydroxy equivalents in the capped isocyanate crosslinking agent to hydroxy equivalents in the hydroxy functional polymer is typically within the range of 1:3 to 3:1, preferably 1:2 to 2:1. While equivalent ratios outside of this range can be employed, that they are generally less desirable due to performance deficiencies in cured films obtained therefrom. Coating compositions comprising hydroxy functional polymer and capped isocyanate functional crosslinking agent are typically cured at a temperature of from 120° C. to 190° C. over a period of from 10 to 60 minutes.

Curable coating compositions may optionally contain additives, such as waxes to improve the slip properties of the cured coating, degassing additives, such as benzoin, adjuvant resin to modify and optimize coating properties, antioxidants and ultraviolet (UV) light absorbers. Examples of useful antioxidants and UV light absorbers include those available commercially from Ciba Specialty Chemicals under the trade names IRGANOX and TINUVIN. These optional additives, when used, are typically present in amounts up to 20 percent by weight, based on total weight of resin solids of the curable composition.

Curable powder coating compositions useful in the present invention are typically prepared by first dry blending the functional polymer, for example, epoxide functional polymer, the crosslinking agent, the polymeric flow control agent and additives such as degassing agent and catalysts in a blender, such as a Henshel blade blender. The blender is operated for a period of time sufficient to result in a homogeneous dry blend of the materials charged thereto. The homogeneous dry blend is then melt blended in an extruder, such as a twin screw co-rotating extruder, operated within a temperature range sufficient to melt but not gel the components. For example, when preparing curable powder coating compositions comprising epoxide functional crosslinking agent, the extruder is typically operated within a temperature range of from 80° C. to 140° C., preferably from 100° C. to 125° C.

Optionally, curable powder coating compositions of the present invention may be melt blended in two or more steps. For example, a first melt blend is prepared in the absence of cure catalyst. A second melt blend is prepared at a lower temperature, from a dry blend of the first melt blend and the cure catalyst. The melt blend curable powder coating composition is typically milled to an average particle size of from, for example, 15 to 30 microns.

The thermosetting composition of the present invention may be a liquid and may be waterborne, but is typically solvent borne. Suitable solvent carriers include the various esters, ethers, and aromatic solvents, including mixtures thereof, that are known in the art of coating formulation. The composition typically has a total solids content of about 40 to about 80 percent by weight.

In an embodiment of the present invention, the liquid coating composition is a mixture of (a), (b), and (c) described above. The present liquid coating compositions will typically include (a) a first reactant having functional groups, (b) a second reactant that is a crosslinking agent having functional groups that are co-reactive towards and can form covalent bonds with the functional groups of the first reactant, and (c) the copolymer composition of the present invention as a copolymer flow control additive. The first and second reactants of the curable powder coating composition may each independently comprise one or more functional species as discussed above with regard to powder coating compositions.

Not wishing to be limited to any one set of functional groups, there are several examples of co-reactive functional groups that can be used in the present liquid coating composition. The functional groups of the first reactant can be, but are not limited to, epoxy or oxirane, carboxylic acid, hydroxy, amide, oxazoline, aceto acetate, isocyanate, methylol, methylol ether, or carbamate. The second or crosslinking reactant has a functional group different than that contained in the first reactant and is co-reactive toward the functional groups of the first reactant and can be, but is not limited to, epoxy or oxirane, carboxylic acid, hydroxy, isocyanate, capped isocyanate, amine, methylol, methylol ether, and beta-hydroxyalkylamide.

The liquid thermosetting composition of the present invention may contain color pigments conventionally used in surface coatings and may be used as a monocoat, that is, a pigmented coating. Suitable color pigments include, for example, inorganic pigments, such as titanium dioxide, iron oxides, chromium oxide, lead chromate, and carbon black, and organic pigments, such as phthalocyanine blue and phthalocyanine green. Mixtures of the above-mentioned pigments may also be used. Suitable metallic pigments include, in particular, aluminum flake, copper bronze flake and metal oxide coated mica, nickel flakes, tin flakes, and mixtures thereof.

In general, the pigment is incorporated into the liquid coating composition in amounts up to about 80 percent by weight, based on the total weight of coating solids. The metallic pigment is employed in amounts of about 0.5 to about 25 percent by weight based on the total weight of coating solids.

As stated above, the liquid thermosetting compositions of the present invention may be used in a method of coating a substrate comprising applying a thermosetting composition to the substrate, coalescing the thermosetting composition over the substrate in the form of a substantially continuous film, and curing the thermosetting composition.

The compositions can be applied to various substrates to which they adhere including wood, metals, glass, and plastic. The compositions can be applied by conventional means including brushing, dipping, flow coating, spraying and the like, but they are most often applied by spraying. The usual spray techniques and equipment for air spraying and electrostatic spraying and either manual or automatic methods can be used.

After application of the composition to the substrate, the composition is allowed to coalesce to form a substantially continuous film on the substrate. Typically, the film thickness will be about 0.01 to about 5 mils (about 0.254 to about 127 microns), preferably about 0.1 to about 2 mils (about 2.54 to about 50.8 microns) in thickness. The film is formed on the surface of the substrate by driving solvent, i.e., organic solvent and/or water, out of the film by heating or by an air drying period. Preferably, the heating will only be for a short period of time, sufficient to ensure that any subsequently applied coatings can be applied to the film without dissolving the composition. Suitable drying conditions will depend on the particular composition, but, in general, a drying time of from about 1 to 5 minutes at a temperature of about 68–250°F. (20–121° C.) will be adequate. More than one coat of the composition may be applied to develop the optimum appearance. Between coats the previously applied coat may be flashed, that is, exposed to ambient conditions for about 1 to 20 minutes.

The film-forming composition of the present invention is preferably used as the clear coat layer in a multi-component composite coating composition, such as a "color-plus-clear" coating system, which includes at least one pigmented or colored base coat and at least one clear topcoat. In this embodiment, the clear film-forming composition may include the thermosetting composition of the present invention.

The film-forming composition of the base coat in the color-plus-clear system can be any of the compositions useful in coatings applications, particularly automotive applications. The film-forming composition of the base coat comprises a resinous binder and a pigment to act as the colorant. Particularly useful resinous binders are acrylic polymers, polyesters, including alkyds, and polyurethanes. Polymers prepared using atom transfer radical polymerization may also be used as resinous binders in the base coat.

The base coat compositions may be solvent borne or waterborne. Waterborne base coats in color-plus-clear compositions are disclosed in U.S. Pat. No. 4,403,003, and the resinous compositions used in preparing these base coats can be used in the practice of this invention. Also, waterborne polyurethanes such as those prepared in accordance with U.S. Pat. No. 4,147,679 can be used as the resinous binder in the base coat. Further, waterborne coatings such as those described in U.S. Pat. No. 5,071,904 can be used as the base coat.

The base coat contains pigments to give it color. Suitable pigments include those discussed above. In general, the pigment is incorporated into the coating composition in amounts of about 1 to 80 percent by weight based on weight of coating solids. Metallic pigment is employed in amounts of about 0.5 to 25 percent by weight based on weight of coating solids.

If desired, the base coat composition may contain additional materials well known in the art of formulated surface coatings, including those discussed above. These materials can constitute up to 40 percent by weight of the total weight of the coating composition.

The base coating compositions can be applied to various substrates to which they adhere by conventional means, but they are most often applied by spraying. The usual spray techniques and equipment for air spraying and electrostatic spraying and either manual or automatic methods can be used.

During application of the base coat composition to the substrate, a film of the base coat is formed on the substrate. Typically, the base coat thickness will be about 0.01 to 5 mils (0.254 to 127 microns), preferably 0.1 to 2 mils (2.54 to 50.8 microns) in thickness.

After application of the base coat to the substrate, a film is formed on the surface of the substrate by driving solvent out of the base coat film by heating or by an air drying period, sufficient to ensure that the clear coat can be applied to the base coat without the former dissolving the base coat composition, yet insufficient to fully cure the base coat. More than one base coat and multiple clear coats may be applied to develop the optimum appearance. Usually between coats, the previously applied coat is flashed.

The clear topcoat composition may be applied to the base coated substrate by any conventional coating technique, such as brushing, spraying, dipping or flowing, but spray applications are preferred because of superior gloss. Any of the known spraying techniques may be employed, such as compressed air spraying, electrostatic spraying, and either manual or automatic methods.

After application of the clear coat composition to the base coat, the coated substrate may be heated to cure the coating layer(s). In the curing operation, solvents are driven off and the film-forming materials in the composition are crosslinked. The heating or curing operation is usually carried out at a temperature in the range of from at least ambient (in the case of free polyisocyanate crosslinking agents) to 350° F. (ambient to 177° C.) but, if needed, lower or higher temperatures may be used as necessary to activate crosslinking mechanisms.

The present invention is also directed to coating compositions that are applied through electrodeposition. Such compositions include active hydrogen group-containing polymers and the present copolymer composition as a flow control and/or anti-cratering additive. The active hydrogen-containing polymer typically has a suitable ionic group. Suitable ionic groups include anionic and cationic groups. Suitable cationic groups include, but are not limited to onium salt groups. The onium salt containing polymer may have an equivalent weight of at least 1,000 grams/equivalent, typically at least 1,500 grams/equivalent. The onium salt group equivalent weight of the polymer is also less than 15,000 grams/equivalent, typically less than 10,000 grams/equivalent, and often times less than 6,000 grams/equivalent. The onium salt group equivalent weight of the active hydrogen group-containing polymer may range between any combination of these values, inclusive of the recited values. As used herein, onium salt group equivalent weights are determined in accordance with ASTM D-4370.

The active hydrogen group-containing polymer containing onium salt groups may be present in the thermosetting compositions of the invention as a resinous binder (i.e., a film-forming polymer) or as an additive in combination with a separate resinous binder. When used as an additive, for example, as a reactive diluent, the active hydrogen group-containing polymer has a high degree of functionality and a correspondingly low equivalent weight. However, it should be appreciated that for other applications, the additive may have low functionality (it may be monofunctional) and a correspondingly high equivalent weight.

In an embodiment of the present invention, the electrodeposition coating composition will typically include (a) a first reactant having functional groups, (b) a second reactant that is a crosslinking agent having functional groups that are co-reactive towards and can form covalent bonds with the functional groups of the first reactant, and (c) the copolymer composition of the present invention as a copolymer flow control additive. The first and second reactants of the electrodeposition coating composition may each independently comprise one or more functional species as discussed above with regard to liquid and powder coating compositions.

Not wishing to be limited to any one set of functional groups, there are several examples of co-reactive functional groups that can be used in the present electrodeposition coating composition. The functional groups of the first reactant can be, but are not limited to, epoxy or oxirane, carboxylic acid, hydroxy, amide, oxazoline, aceto acetate, isocyanate, methylol, methylol ether, or carbamate. The second or crosslinking reactant has a functional group different than that contained in the first reactant and is co-reactive toward the functional groups of the first reactant and can be, but is not limited to, epoxy or oxirane, carboxylic acid, hydroxy, isocyanate, capped isocyanate, amine, methylol, methylol ether, and beta-hydroxyalkylamide.

The active hydrogen group-containing polymer containing onium salt groups is typically present in the thermosetting compositions of the invention in an amount of at least 0.5 percent by weight (when used as an additive) and in an amount of at least 25 percent by weight (when used as a resinous binder), based on total weight of resin solids of the thermosetting composition. The active hydrogen group-containing polymers are also typically present in the thermosetting compositions in an amount of less than 95 percent by weight, and typically in an amount of less than 80 percent by weight, based on total weight of resin solids of the thermosetting composition. The active hydrogen group-containing polymer may be present in the thermosetting compositions of the invention in an amount ranging between any combination of these values, inclusive of the recited values.

The thermosetting composition of the present invention further comprises (b) a curing agent having at least two functional groups which are reactive with the active hydrogen groups of the polymer (a) described above.

Examples of suitable curing agents for use in the thermosetting compositions of the invention include polyisocyanate and aminoplast curing agents. The preferred curing agents for use in thermosetting compositions of the invention, particularly for cationic electrodeposition, are capped organic polyisocyanates. The polyisocyanates can be fully capped as described in U.S. Pat. No. 3,984,299, column 1, lines 1–68, column 2, and column 3, lines 1–15, or partially capped and reacted with the polymer backbone as described in U.S. Pat. No. 3,947,338, column 2, lines 65–68, column 3, and column 4, lines 1–30, which are incorporated by reference herein. In this instance by "capped" is meant that the isocyanate groups have been reacted with a compound so that the resultant capped isocyanate group is stable to active hydrogens at ambient temperature but reactive with active hydrogens in the film forming polymer at elevated temperatures usually between 90° C. and 200° C.

Suitable polyisocyanates include aromatic and aliphatic polyisocyanates, including cycloaliphatic polyisocyanates and representative examples include diphenylmethane-4,4'-diisocyanate (MDI), 2,4- or 2,6-toluene diisocyanate (TDI), including mixtures thereof, p-phenylene diisocyanate, tetramethylene and hexamethylene diisocyanates, dicyclohexylmethane-4,4'-diisocyanate, isophorone diisocyanate, mixtures of phenylmethane-4,4'-diisocyanate and polymethylene polyphenylisocyanate. Higher polyisocyanates, such as triisocyanates, can be used. An example would include triphenylmethane-4,4',4"-triisocyanate. Isocyanate prepolymers with polyols, such as neopentyl glycol and trimethylolpropane, and with polymeric polyols, such as polycaprolactone diols and triols (NCO/OH equivalent ratio greater than 1), can also be used.

The polyisocyanate curing agent is typically utilized in conjunction with the active hydrogen group-containing polymer (a) in an amount of at least 1 percent by weight, preferably at least 15 percent by weight, and more preferably at least 25 percent by weight. Also, the polyisocyanate curing agent is typically used in conjunction with the active hydrogen group-containing polymer in an amount of less than 50 percent by weight, and preferably less than 40 percent by weight, based on weight of total resin solids of (a) and (b). The polyisocyanate curing agent may be present in the thermosetting composition of the present invention in an amount ranging between any combination of these values, inclusive of the recited values.

The thermosetting compositions of the present invention are in the form of an aqueous dispersion. The term "dispersion" is believed to be a two-phase transparent, translucent, or opaque resinous system in which the resin is in the dispersed phase and the water is in the continuous phase. The average particle size of the resinous phase is generally less than 1.0 and usually less than 0.5 microns, preferably less than 0.15 micron.

The concentration of the resinous phase in the aqueous medium is at least 1 and usually from about 2 to about 60 percent by weight based on total weight of the aqueous dispersion. When the compositions of the present invention are in the form of resin concentrates, they generally have a resin solids content of about 20 to about 60 percent by weight based on weight of the aqueous dispersion.

The thermosetting compositions of the invention are typically in the form of electrodeposition baths which are usually supplied as two components, (1) a clear resin feed, which includes generally the active hydrogen-containing polymer which contains onium salt groups, i.e., the main film-forming polymer, the curing agent, and any additional water-dispersible, non-pigmented components, and (2) a pigment paste, which generally includes one or more pigments, a water-dispersible grind resin which can be the same or different from the main-film forming polymer, and, optionally, additives such as wetting or dispersing aids. Electrodeposition bath components (1) and (2) are dispersed in an aqueous medium which comprises water and, usually, coalescing solvents. Alternatively, the electrodeposition bath may be supplied as a one-component system which contains the main film-forming polymer, the curing agent, the pigment paste, and any optional additives in one package. The one-component system is dispersed in an aqueous medium as described above.

The electrodeposition bath of the present invention has a resin solids content usually within the range of about 5 to 25 percent by weight based on total weight of the electrodeposition bath.

As aforementioned, besides water, the aqueous medium may contain a coalescing solvent. Useful coalescing solvents include hydrocarbons, alcohols, esters, ethers, and ketones. The preferred coalescing solvents include alcohols, polyols, and ketones. Specific coalescing solvents include isopropanol, butanol, 2-ethylhexanol, isophorone, 2-methoxypentanone, ethylene, and propylene glycol and the monoethyl, monobutyl, and monohexyl ethers of ethylene or propylene glycol. The amount of coalescing solvent is generally between about 0.01 and 25 percent and, when used, preferably from about 0.05 to about 5 percent by weight based on total weight of the aqueous medium.

As discussed above, a pigment composition and, if desired, various additives such as surfactants, wetting agents, or catalyst can be included in the dispersion. The pigment composition may be of the conventional type comprising pigments, for example, iron oxides, strontium chromate, carbon black, coal dust, titanium dioxide, talc, barium sulfate, as well as color pigments, such as cadmium yellow, cadmium red, chromium yellow, and the like. The pigment content of the dispersion is usually expressed as a pigment-to-resin ratio. In the practice of the invention, when pigment is employed, the pigment-to-resin ratio is usually within the range of about 0.02 to 1:1. The other additives mentioned above are usually in the dispersion in amounts of about 0.01 to 3 percent by weight based on weight of resin solids.

The thermosetting compositions of the present invention can be applied by electrodeposition to a variety of electroconductive substrates, especially metals, such as untreated steel, galvanized steel, aluminum, copper, magnesium, and conductive carbon coated materials. The applied voltage for electrodeposition may be varied and can be, for example, as low as 1 volt to as high as several thousand volts, but typically between 50 and 500 volts. The current density is usually between 0.5 ampere and 5 amperes per square foot and tends to decrease during electrodeposition indicating the formation of an insulating film.

After the coating has been applied by electrodeposition, it is cured usually by baking at elevated temperatures, such as about 90° C. to about 260° C., for about 1 minute to about 40 minutes.

The present invention is more particularly described in the following examples, which are intended to be illustrative only, since numerous modifications and variations therein will be apparent to those skilled in the art. Unless otherwise specified, all parts and percentages are by weight.

EXAMPLE 1-A

Synthesis of alternating copolymer diisobutylene/methyl methacrylate-alt-hydroxypropyl acrylate/butyl acrylate. The ingredients in Table 3 were used for the polymerization.

TABLE 3

| | Ingredients | Parts by weight (grams) |
|---|---|---|
| Charge 1 | Diisobutylene | 337.00 |
| Charge 2 | t-Amylperoxy(2-ethyl hexanoate) | 33.70 |
| Charge 3 | Methyl Methacrylate | 337.00 |
| | Hydroxypropyl Acrylate | 112.30 |
| | Butyl Acrylate | 337.00 |

Charge 1 was added to a 4-liter stirred stainless steel pressure reactor. The reactor was then pressurized with nitrogen providing a 5 psig pad on the reactor. The agitation on the reactor was 500 rpm and the reactor temperature was adjusted to 125° C. Charge 2 was added to the reactor at an addition rate of 9.62 grams/hour over 3.5 hours. Fifteen minutes after Charge 2 was started, Charge 3 was added to the reactor at an addition rate of 262.10 grams/hour over 3 hours. During the monomer addition the temperature was maintained at 125° C. at 40 PSI. After the addition of Charge 2 and Charge 3 was complete, the reaction mixture was held for 2 hours. The reactor was then cooled to 25°C., and vented. Gas chromatography (GC) analysis of the reaction mixture showed that all of the (meth)acrylate had reacted. The reaction mixture was transferred to a 3 L flask, and was vacuum-stripped at 130° C. The reaction mixture was cool to 80° C. and 200 grams of n-butyl acetate was added. The solids of the resulting polymer solution was determined to be 78.3% determined at 110° C. for one hour. The copolymer had a number average molecular weight ($M_n$) of 1,200 and polydispersity ($M_w/M_n$) of 2.0 (determined by gel permeation chromatography using polystyrene as a standard). A $^{13}C$ NMR spectrum was consistent with a molar copolymer composition of 21.9% diisobutylene, 11.1% hydroxypropyl acrylate, 33.5% methyl methacrylate, and 33.5% butyl acrylate.

EXAMPLE 1-B

Synthesis of alternating copolymer diisobutylene-alt-hydroxypropyl acrylate/butyl acrylate. The ingredients in Table 4 were used for the polymerization in isopropanol solvent.

TABLE 4

| | Ingredients | Parts by weight (grams) |
|---|---|---|
| Charge 1 | Diisobutylene | 500 |
| | Isopropanol | 400 |
| Charge 2 | Di-t-amyl Peroxide | 20 |
| | Isopropanol | 100 |

TABLE 4-continued

| | Ingredients | Parts by weight (grams) |
|---|---|---|
| Charge 3 | Hydroxypropyl Acrylate | 250 |
| | Butyl Acrylate | 250 |

Charge 1 was added to a 4-liter stirred stainless steel pressure reactor. The reactor was pressurized with nitrogen to provide a 5 psig pad on the reactor. The agitation on the reactor was set at 500 rpm and the reactor temperature was adjusted to 150° C. Charge 2 was added to the reactor at an addition rate of 48 grams/hour over 2.5 hours. After 15 minutes Charge 3 was added to reactor at an addition rate 250 grams/hour over 2 hours. During the monomer addition the temperature was maintained at 150° C. and 100 PSI. After Charge 2 and Charge 3 were in the reactor, the reaction mixture was held for 2 hours. The reactor was then cooled to 25° C., and vented. GC analysis of the reaction mixture showed that all acrylates were reacted. The reaction mixture was transferred to a 2 L flask, and was vacuum-stripped at 130° C. The solids of the resulting polymer solution was determined to be 100% determined at 110° C. for one hour. The copolymer had $M_n$=850 and $M_w/M_n$=1.7. The $^{13}C$ NMR spectrum was consistent with a molar copolymer composition of 24.7% diisobutylene, 37.65% hydroxypropyl acrylate, and 37.65% butyl acrylate.

EXAMPLE 1-C

Synthesis of alternating copolymer diisobutylene-alt-hydroxyethyl acrylate/butyl acrylate. The ingredients in Table 5 were used for the polymerization in isopropanol solvent.

TABLE 5

| | Ingredients | Parts by weight (grams) |
|---|---|---|
| Charge 1 | Diisobutylene | 500 |
| | Isopropanol | 400 |
| Charge 2 | Di-t-amyl Peroxide | 20 |
| | Isopropanol | 100 |
| Charge 3 | Hydroxyethyl Acrylate | 250 |
| | Butyl Acrylate | 250 |

Charge 1 was added to a 4-liter stirred stainless steel pressure reactor. The reactor was then pressurized with nitrogen to provide a 5 psig pad on the reactor. The agitation on the reactor was set at 500 rpm and the reactor temperature was adjusted to 150° C. Charge 2 was added to the reactor at an addition rate of 48 grams/hour over 2.5 hours. After 15 minutes Charge 3 was added to reactor at an addition rate of 250 grams/hour over 2 hours. During the monomer addition the temperature was maintained at 150° C. and 100 PSI. After Charge 2 and Charge 3 were in the reactor, the reaction mixture was held for 2 hours. The reactor was then cooled to 25° C., and vented. GC analysis of the reaction mixture showed that all acrylates were reacted. The reaction mixture was transferred to a 2 L flask, and was vacuum-stripped at 130° C. The solids of the resulting polymer was determined to be 100% determined at 110° C. for one hour. The copolymer had number average molecular weight, $M_n$=910 and polydispersity $M_w/M_n$=1.8 (determined by gel permeation chromatography using polystyrene as a standard). The $^{13}C$ NMR spectrum is consistent with copolymer composition 25% Diisobutylene, 37.5% Hydroxyethyl acrylate, and 37.5% Butyl acrylate.

EXAMPLE 2-D

Synthesis of alternating copolymer diisobutylene-alt-hydroxypropyl acrylate/butyl acrylate/acrylic acid. The ingredients in Table 6 were used for the polymerization.

TABLE 6

| | Ingredients | Parts by weight (grams) |
| --- | --- | --- |
| Charge 1 | Diisobutylene | 1120.00 |
| Charge 2 | Di-t-amyl Peroxide | 93.60 |
| Charge 3 | Acrylic acid | 144.00 |
| | Hydroxypropyl Acrylate | 720.00 |
| | Butyl acrylate | 1136.00 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at an addition rate of 37.4 grams/hour over 2.5 hours. After 15 minutes Charge 3 was added to reactor at an addition rate of 1000 grams/hour over 2 hours. During the monomer addition the temperature was maintained at 150° C. at 100 PSI. After Charge 2 and charge 3 were in the reactor, the reaction mixture was held for 2 hours. The reactor was then cooled to 25° C., and vented. GC analysis of the reaction mixture show that all acrylates were reacted. The reaction mixture was transferred to a 5 L flask, and was vacuum-stripped at 130° C. The solids of the resulting polymer was dissolved in 500 grams of butyl carbitol (Union Carbide) and the final solids of the solution was determined to be 80.73%, determined at 110° C. for one hour. The copolymer had $M_n=2080$ and $M_w/M_n=2.7$. The $^{13}C$ NMR spectrum was consistent with a molar copolymer composition of 24% diisobutylene, 27.36% hydroxypropyl acrylate, 43.17% butyl acrylate, and 5.47% acrylic acid.

EXAMPLE 3-E

Synthesis of alternating copolymer diisobutylene-alt-hydroxyethyl acrylate/butyl acrylate. The ingredients in Table 7 were used for the polymerization.

TABLE 7

| | Ingredients | Parts by weight (grams) |
| --- | --- | --- |
| Charge 1 | Diisobutylene | 1000.00 |
| Charge 2 | Di-t-amyl Peroxide | 85.80 |
| Charge 3 | Hydroxyethyl Acrylate | 714.20 |
| | Butyl Acrylate | 1142.90 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at an addition rate of 34.5 grams/hour over 2.5 hours. After 15 minutes Charge 3 was added to reactor at the addition rate of 928.6 grams/hour over 2 hours. During the monomer addition the temperature was maintained at 150° C. at 70 PSI. After charge 2 and charge 3 were in the reactor, the reaction mixture was held for 2 hours. The reactor was then cooled to 25° C., and vented. GC analysis of reaction mixture showed that all acrylates were reacted. The reaction mixture was transferred to a 5 L flask, and was vacuum-stripped at 130° C. The final solids of the resulting polymer was determined to be 97.56% 110° C. for one hour. The copolymer had $M_n=1760$ and $M_w/M_n=2.4$. The $^{13}C$ NMR spectrum is consistent with a copolymer composition of 24.43% diisobutylene, 29.06% hydroxyethyl acrylate, and 46.51% butyl acrylate.

EXAMPLE 3-F

Synthesis of alternating copolymer diisobutylene-alt-hydroxypropyl acrylate/butyl acrylate. The ingredients in Table 8 were used for the polymerization.

TABLE 8

| | Ingredients | Parts by weight (grams) |
| --- | --- | --- |
| Charge 1 | Diisobutylene | 1359.20 |
| Charge 2 | Di-t-amyl Peroxide | 116.60 |
| Charge 3 | Hydroxypropyl Acrylate | 970.80 |
| | Butyl Acrylate | 1553.40 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at an addition rate of 46.6 grams/hour over 2.5 hours. After 15 minutes Charge 3 was added to the reactor at an addition rate of 1262.7 grams/hour over 2 hours. During the monomer addition the temperature was maintained at 150° C. and 100 PSI. After charge 2 and charge 3 were in the reactor, the reaction mixture was held for 2 hours. The reactor was then cooled to 25° C., and vented. GC analysis of the reaction mixture showed that all acrylates were reacted. The reaction mixture was transferred to a 5 L flask, and was vacuum-stripped at 130° C. The final solids of the resulting polymer was determined to be 97.96% determined at 110° C. for one hour. The copolymer had $M_n=1610$ and $M_w/M_n=2.2$. The $^{13}C$ NMR spectrum is consistent with a molar copolymer composition of 23.15% diisobutylene, 29.56% hydroxypropyl acrylate, and 47.29% butyl acrylate.

EXAMPLE 3-G

Synthesis of alternating copolymer isobutylene-alt-hydroxypropyl acrylate/butyl acrylate. The ingredients in Table 9 were used for the polymerization:

TABLE 9

| | Ingredients | Parts by weight (grams) |
| --- | --- | --- |
| Charge 1 | Isobutylene | 1000.00 |
| Charge 2 | Di-t-amyl Peroxide | 85.80 |
| Charge 3 | Hydroxypropyl Acrylate | 714.20 |
| | Butyl Acrylate | 1142.90 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at an addition rate of 34.3 grams/hour over 2.5 hours. After 15 minutes Charge 3 was added to reactor at an addition rate of 928.6 grams/hour over 2 hours. During the monomer addition the temperature was maintained at 150° C. at 250 PSI. After charge 2 and charge 3 were in the reactor, the reaction mixture was held for 2 hours. The reactor was then cooled to 25° C., and vented. GC analysis of the reaction mixture showed that all acrylates were reacted. The reaction mixture was transferred to a 5 L flask, and was vacuum-stripped at 130° C. The final solids of the resulting polymer was determined to be 89.97% (remainder toluene) at 110° C. for one hour. The copolymer had $M_n=2760$ and $M_w/M_n=2.7$. The $^{13}C$ NMR spectrum is consistent with a copolymer composition of 35% isobutylene, 25% hydroxypropyl acrylate, and 40% butyl acrylate.

EXAMPLE 4-I

Synthesis of copolymer diisobutylene/hydroxypropyl acrylate/butyl methacrylate/styrene/acrylic acid/butyl acrylate. The ingredients in Table 10 were used for the polymerization:

TABLE 10

| | Ingredients | Parts by weight (grams) |
|---|---|---|
| Charge 1 | Diisobutylene | 500.00 |
| | Isopropanol | 400.00 |
| Charge 2 | Di-t-amyl Peroxide | 30.00 |
| | Isopropanol | 100.00 |
| Charge 3 | Hydroxypropyl Acrylate | 450.00 |
| | Butyl Methacrylate | 200.00 |
| | Styrene | 100.00 |
| | Acrylic Acid | 30.00 |
| | Butyl Acrylate | 220.00 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at addition rate of 52 grams/hour over 2.5 hours. After 15 minutes Charge 3 was added to reactor at the addition rate 500 grams/hour over 2 hours. During the monomer addition the temperature was maintained at 150° C. at 100 PSI. After charge 2 and charge 3 were in the reactor, the reaction mixture was held for 2 hours. The reactor was then cooled to 25° C., and vented. GC analysis of the reaction mixture showed that all acrylates, methacrylates and styrene were reacted. The reaction mixture was transferred to a 3 L flask, and was vacuum-stripped at 130° C. The final solids of the resulting polymer was determined by adding 200 grams of butyl acetate to the polymer mixture. The solids were measured at 82.2% at 110° C. for one hour. The copolymer had $M_n$=1560 and $M_w/M_n$=2.2. The $^{13}C$ NMR spectrum is consistent with a molar copolymer composition of 20.4% Diisobutylene, 36.3% Hydroxypropyl acrylate, 16.1% Butyl methacrylate, 8.1% Styrene, 2.4% Acrylic acid, and 17.6% Butyl acrylate.

EXAMPLE 4-J

Synthesis of copolymer diisobutylene/hydroxypropyl acrylate/butyl methacrylate/styrene/butyl acrylate. The ingredients in Table 11 were used for the polymerization:

TABLE 11

| | Ingredients | Parts by weight (grams) |
|---|---|---|
| Charge 1 | Diisobutylene | 1000.00 |
| Charge 2 | Di-t-amyl Peroxide | 90.00 |
| Charge 3 | Hydroxypropyl Acrylate | 900.00 |
| | Butyl Methacrylate | 400.00 |
| | Styrene | 200.00 |
| | Butyl Acrylate | 500.00 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at an addition rate of 36 grams/hour over 2.5 hours. After 15 minutes Charge 3 was added to reactor at the addition rate 1000 grams/hour over 2 hours. During the monomer addition the temperature was maintained at 150° C. at 100 PSI. After charge 2 and charge 3 were in the reactor, the reaction mixture was held for 2 hours. The reactor was then cooled to 25° C, and vented. GC analysis of the reaction mixture showed that all acrylates, methacrylates and styrene were reacted. The reaction mixture was transferred to 5 L flask, and was vacuum-stripped at 125° C. The final solids of the resulting polymer was determined to be 98.63% at 110° C. for one hour. The copolymer had $M_n$=1960 and $M_w/M_n$=2.3. The $^{13}C$ NMR spectrum is consistent with a molar copolymer composition of 17.67% diisobutylene, 37.1% hydroxypropyl acrylate, 16.36% butyl methacrylate, 8.25% styrene, and 20.62% butyl acrylate.

EXAMPLE 4-K

Synthesis of copolymer diisobutylene/hydroxypropyl acrylate/butyl methacrylate/styrene/hydroxyethyl methacrylate/butyl acrylate. The ingredients in Table 12 were used for the polymerization.

TABLE 12

| | Ingredients | Parts by weight (grams) |
|---|---|---|
| Charge 1 | Diisobutylene | 1000.00 |
| Charge 2 | Di-t-amyl Peroxide | 90.00 |
| Charge 3 | Hydroxypropyl Acrylate | 450.00 |
| | Butyl Methacrylate | 400.00 |
| | Styrene | 200.00 |
| | Hydroxyethyl Methacrylate | 450.00 |
| | Butyl Acrylate | 500.00 |
| Charge 4 | Xylene | 250.00 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at an addition rate of 36 grams/hour over 2.5 hours. After 15 minutes Charge 3 was added to reactor at an addition rate of 1000 grams/hour over 2 hours. During the monomer addition the temperature was maintained at 150° C. at 100 PSI. After charge 2 and charge 3 were in the reactor, the reaction mixture was held for 2 hours. The reactor was then cooled to 25° C., and vented. GC analysis of the reaction mixture showed that all acrylates, methacrylates and styrene were reacted. The reaction mixture was transferred to a 5 L flask, and was vacuum-stripped at 125° C. The final solids of the resulting polymer was determined by adding 250 grams of xylene to the polymer mixture. The solids were 87.60% determined at 110° C. for one hour. The copolymer had $M_n$=1930 and $M_w/M_n$=2.6. The $^{13}C$ NMR spectrum is consistent with a molar copolymer composition of 15.6% diisobutylene, 18.99% hydroxypropyl acrylate, 16.88% butyl methacrylate, 8.44% styrene, 18.99% hydroxyethyl methacrylate and 21.10% butyl acrylate.

EXAMPLE 4-L

Synthesis of carbamate functional polymer from diisobutylene/hydroxypropyl acrylate/butyl methacrylate/styrene/butyl acrylate (DIB/HPA/BMA/Sty/BA) copolymer from example 4-J. A carbamate-functional copolymer was prepared from the ingredients in Table 13.

TABLE 13

| | Ingredients | Parts by weight (grams) |
|---|---|---|
| Charge 1 | Acrylic/Diisobutylene copolymer solution (Example 4-J) | 1067.30 |
| | Xylene | 85.60 |
| | Aromatic 100 (ExxonMobil) | 85.60 |
| | Methyl carbamate | 169.00 |
| | Butyl stannoic acid | 2.23 |
| | Triphenyl phosphite | 2.23 |

A suitable reactor was charged with the above ingredients and equipped with a thermocouple, overhead stirrer, nitrogen inlet and a reflux condenser. The mixture was heated to 144° C. under a nitrogen blanket. At this temperature, the reaction refluxed slightly. The reaction mixture was held for one hour at 145° C. After the hold period was complete, the reflux condenser was removed, and the reactor was equipped for distillation (short column, distillation head, thermocouple, and receiver flask) at atmospheric pressure. Distillate began to be collected at 145° C. The temperature of the reaction was gradually increased over a 6 hour period to 155° C. to maintain a steady rate of distillation. When distillation ceased and 64.5 ml of methanol had been collected, the reaction mixture was sampled and the hydroxy value found to be 46.5 at 85.88% solids. The contents of the reactor were then cooled.

EXAMPLE 4-M

Synthesis of carbamate functional polymer from diisobutylene/hydroxypropyl acrylate/butyl methacrylate/styrene/hyroxethyl methacrylate/butyl acrylate (DIB/HPA/BMA/Sty/HEMA/BA) copolymer (example 4-K). A carbamate-functional copolymer was prepared from the ingredients in Table 14.

TABLE 14

| | Ingredients | Parts by weight (grams) |
|---|---|---|
| Charge 1 | Acrylic/Diisobutylene copolymer solution (Example 4-K) | 1172.90 |
| | Methyl carbamate | 169.00 |
| | Butyl stannoic acid | 2.40 |
| | Triphenyl phosphite | 2.40 |

A suitable reactor was charged with the above ingredients and equipped with a thermocouple, overhead stirrer, nitrogen inlet and a reflux condenser. The mixture was heated to 144° C. under a nitrogen blanket. At this temperature, the reaction refluxed slightly. The reaction mixture was held for one hour at 145° C. After the hold period was complete, the reflux condenser was removed, and the reactor was equipped for distillation (short column, still head, thermocouple, and receiver flask) at atmospheric pressure. Distillate began to be collected at 145° C. The temperature of the reaction was gradually increased over to 6 hours to 155° C. to maintain a steady rate of distillation. When distillation ceased and 65.6 ml methanol collected, the reaction mixture was sampled and the hydroxy value found to be 59.1 at 88.55% solids. The contents of the reactor were then cooled.

EXAMPLE 5-N

Synthesis of copolymer isobutylene/dimethylaminoethyl methacrylate-alt-hydroxyethyl acrylate/2-ethylhexyl acrylate. The ingredients in Table 15 were used for the polymerization.

TABLE 15

| | Ingredients | Parts by weight (grams) |
|---|---|---|
| Charge 1 | Isobutylene | 500.00 |
| Charge 2 | Di-t-amyl Peroxide | 75.00 |
| Charge 3 | Hydroxyethyl Acrylate | 750.00 |
| | 2-Ethylhexyl Acrylate | 1000.00 |
| | Dimethylaminoethyl methacrylate | 250.00 |
| Charge 4 | 2-butoxy ethanol | 250.00 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at an addition rate of 30.0 grams/hour over 2.5 hours. After 15 minutes charge 3 was added to reactor at an addition rate of 1000 grams/hour over 2 hours. During the monomer addition the temperature was maintained at 150° C. at 100 PSI. After charge 2 and charge 3 were in the reactor, the reaction mixture was held for 2 hours. The reactor was then cooled to 80° C., and vacuum-stripped for 30 minutes. Charge 4 was added over 15 minutes at 1000 grams/hour. The final solids of the resulting polymer was determined to be 86.49% at 110° C. for one hour. The copolymer had $M_n$=2900 and $M_w/M_n$=3.7. The $^{13}C$ NMR spectrum is consistent with a molar copolymer composition of 20% isobutylene, 30% hydroxyethyl acrylate, 10% dimethylaminoethyl methacrylate and 40% 2-ethylhexyl acrylate.

EXAMPLE 5-N-D

Preparation of an aqueous amine salt dispersion of copolymer isobutylene/dimethylaminoethyl methacrylate-alt-hydroxyethyl acrylate/2-ethylhexyl acrylate. The ingredients in Table 16 were used to make the dispersion.

TABLE 16

| Ingredients | Parts by weight (grams) |
|---|---|
| Deionized water | 1103.4 |
| DMPA | 63.7 |
| Isobutylene/Dimethylaminoethyl methacrylate-alt-Hydroxyethyl acrylate/2-Ethylhexyl acrylate (Example 5-N) | 867.2 |
| Deionized water | 1220.5 |

The ingredients were added sequentially to a suitable vessel under mild agitation. The final solids were 24.9%.

EXAMPLE 5-O

Synthesis of copolymer isobutylene/dimethylaminoethyl methacrylate-alt-hydroxypropyl acrylate/2-ethylhexyl acrylate/ethyl acrylate. The ingredients in Table 17 were used for the polymerization.

TABLE 17

| | Ingredients | Parts by weight (grams) |
|---|---|---|
| Charge 1 | Diisobutylene | 1000.00 |
| Charge 2 | Di-t-amyl Peroxide | 85.70 |
| Charge 3 | Hydroxypropyl Acrylate | 714.30 |

TABLE 17-continued

| Ingredients | Parts by weight (grams) |
|---|---|
| 2-Ethyihexyl Acrylate | 714.30 |
| Dimethylaminoethyl methacrylate | 238.10 |
| Ethyl Acrylate | 238.10 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at addition rate of 34.3 grams/hour over 2.5 hours. After 15 minutes Charge 3 was added to reactor at the addition rate 952.2 grams/hour over 2 hours. During the monomer addition the temperature was maintained at 150° C. at 60 PSI. After charge 2 and charge 3 were in the reactor, the reaction mixture was held for 2 hours. The reactor was then cooled to 25° C. The final solids of the resulting polymer solution was determined to be 76.24% determined at 110° C. for one hour. The copolymer had $M_n$=1150 and $M_w/M_n$=2.0. The $^{13}$C NMR spectrum is consistent with a copolymer composition of 20% diisobutylene, 30% hydroxypropyl acrylate, 10% dimethylaminoethyl methacrylate, 10% ethyl acrylate, and 30% 2-ethylhexyl acrylate.

EXAMPLE 5-O-D

Preparation of an aqueous amine salt dispersion of copolymer diisobutylene/dimethylaminoethyl methacrylate-alt-hydroxypropyl acrylate/2-ethylhexyl acrylate/ethyl acrylate. The ingredients in Table 18 were used for to make the dispersion.

TABLE 18

| Ingredients | Parts by weight (grams) |
|---|---|
| Deionized water | 986.9 |
| DMPB | 63.7 |
| Diisobutylene/Dimethylaminoethyl methacrylate-alt-Hydroxyethyl acrylate/2-Ethylhexyl acrylate/Ethyl acrylate (Example 5-O) | 983.7 |
| Deionized water | 628.0 |

The ingredients were added sequentially to a suitable vessel under mild agitation. The final solids were 30.68%.

EXAMPLE 6-Q

Synthesis of copolymer diisobutylene-alt-hydroxypropyl acrylate/butyl acrylate. The ingredients in Table 19 were used for the polymerization.

TABLE 19

| | Ingredients | Parts by weight (grams) |
|---|---|---|
| Charge 1 | Diisobutylene | 300.00 |
| Charge 2 | Di-t-amyl Peroxide | 90.00 |
| Charge 3 | Hydroxypropyl Acrylate | 855.00 |
| | Butyl Acrylate | 1995.00 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at addition rate of 36 grams/hour over 2.5 hours. After 15 minutes charge 3 was added to reactor at an addition rate of 1425 grams/hour over 2 hours. During the monomer addition the temperature was maintained at 150° C. at 70 PSI. After charge 2 and charge 3 were in the reactor, the reaction mixture was held for 2 hours. The reactor was then cooled to 25° C., and vented. GC analysis of the reaction mixture showed that all acrylates were reacted. The final solids of the resulting polymer was determined to be 96.60% at 110° C. for one hour. The copolymer had $M_n$=4090 and $M_w/M_n$=2.3. The $^{13}$C NMR spectrum was consistent with a molar copolymer composition of 8.3% diisobutylene, 27.5% hydroxypropyl acrylate, and 64.2% butyl acrylate.

EXAMPLE 6-R

Synthesis of copolymer diisobutylene-alt-hydroxypropyl acrylate/butyl acrylate. The ingredients in Table 20 were used for the polymerization.

TABLE 20

| | Ingredients | Parts by weight (grams) |
|---|---|---|
| Charge 1 | Diisobutylene | 310.0 |
| Charge 2 | Di-t-amyl Peroxide | 45.00 |
| Charge 3 | Hydroxypropyl Acrylate | 382.50 |
| | Butyl Acrylate | 892.5 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at addition rate of 18 grams/hour over 2.5 hours. After 15 minutes charge 3 was added to reactor at the addition rate 637.5 grams/hour over 2 hours. During the monomer addition the temperature was maintained at 150° C. at 40 PSI. After charge 2 and charge 3 were in the reactor, the reaction mixture was held for 2 hours. The reactor was then cooled to 25° C. GC analysis of the reaction mixture showed that all acrylates were reacted. The final solids of the resulting polymer was determined to be 92.60% at 110° C. for one hour. The copolymer had $M_n$=2280 and $M_w/M_n$=1.9. The $^{13}$C NMR spectrum was consistent with a molar copolymer composition of 15.6% diisobutylene, 25.3% hydroxypropyl acrylate, and 59.1% butyl acrylate.

EXAMPLE 6-S

Synthesis of copolymer diisobutylene-alt-hydroxypropyl acrylate/butyl acrylate. The ingredients in Table 21 were used for the polymerization.

TABLE 21

| | Ingredients | Parts by weight (grams) |
|---|---|---|
| Charge 1 | Diisobutylene | 450.00 |
| Charge 2 | Di-t-amyl Peroxide | 45.00 |
| Charge 3 | Hydroxypropyl Acrylate | 382.50 |
| | Butyl Acrylate | 892.50 |

Charge 1 was added to a 4-liter stirred stainless steel pressure reactor. The reactor was then pressurized with nitrogen providing a 5 psig pad on the reactor. The-agitation on the reactor was set at 500 rpm and the reactor temperature was adjusted to 150° C. Charge 2 was added to the reactor at an addition rate of 18 grams/hour over 2.5 hours. After 15 minutes charge 3 was added to reactor at an addition rate of 637.5 grams/hour over 2 hours. During the monomer addition the temperature was maintained at 150° C. at 40 PSI. After charge 2 and charge 3 were in the reactor, the reaction mixture was held for 2 hours. The reactor was then cooled to 25° C. GC analysis of the reaction mixture showed that all acrylates were reacted. The final solids of the resulting polymer was determined to be 89.41% at 110° C. for one hour. The copolymer had $M_n=2000$ and $M_w M_n=1.8$. The $^{13}C$ NMR spectrum was consistent with a molar copolymer composition of 21.76% diisobutylene, 23.47% hydroxypropyl acrylate, and 54.77% butyl acrylate.

EXAMPLE 6-T

Synthesis of copolymer diisobutylene-alt-hydroxypropyl acrylate/butyl acrylate. The ingredients in Table 22 were used for the polymerization.

TABLE 22

| | Ingredients | Parts by weight (grams) |
|---|---|---|
| Charge 1 | Diisobutylene | 750.00 |
| Charge 2 | Di-t-amyl Peroxide | 45.00 |
| Charge 3 | Hydroxypropyl Acrylate | 337.50 |
| | Butyl Acrylate | 787.50 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at addition rate of 18 grams/hour over 2.5 hours. After 15 minutes Charge 3 was added to reactor at the addition rate 562.5 grams/hour over 2 hours. During the monomer addition the temperature was maintained at 150° C. at 55 PSI. After charge 2 and charge 3 were in the reactor, the reaction mixture was held for 2 hours. The reactor was then cooled to 25° C. GC analysis of the reaction mixture showed that all acrylates were reacted. The final solids of the resulting polymer were determined to be 79.48% at 110° C. for one hour. The copolymer had $M_n=1180$ and $M_w/M_n=1.7$. The $^{13}C$ NMR spectrum was consistent with a copolymer composition of 26.30% diisobutylene, 22.10% hydroxypropyl acrylate, and 51.60% butyl acrylate.

EXAMPLE 7-U

Synthesis of copolymer diisobutylene-alt-hydroxypropyl acrylate/butyl acrylate/acrylic acid. The ingredients in Table 23 were used for the polymerization.

TABLE 23

| | Ingredients | Parts by weight (grams) |
|---|---|---|
| Charge 1 | Diisobutylene | 1000.00 |
| Charge 2 | Di-t-amyl Peroxide | 91.30 |
| Charge 3 | Hydroxypropyl Acrylate | 785.60 |
| | Butyl Acrylate | 1207.20 |
| | Acrylic Acid | 50.00 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at addition rate of 36.50 grams/hour over 2.5 hours. After 15 minutes charge 3 was added to the reactor at an addition rate of 1021.4 grams/hour over 2 hours. During the monomer addition the temperature was maintained at 150 C. at 60 PSI. After charge 2 and charge 3 were in the reactor, the reaction mixture was held for 2 hours. The reactor was then cooled to 25° C. GC analysis of the reaction mixture showed that all acrylates were reacted. The final solids of the resulting polymer was determined to be 82.67% at 110° C. for one hour. The copolymer had $M_n=1770$ and $M_w/M_n=2.4$. The $^{13}C$ NMR spectrum was consistent with a molar copolymer composition of 20% diisobutylene, 30% hydroxypropyl acrylate, 2% acrylic acid, and 48% butyl acrylate.

EXAMPLE 7-V

Synthesis of copolymer diisobutylene-alt-hydroxypropyl acrylate/butyl acrylate/acrylonitrile. The ingredients in Table 24 were used for the polymerization.

TABLE 24

| | Ingredients | Parts by weight (grams) |
|---|---|---|
| Charge 1 | Diisobutylene | 1000.00 |
| Charge 2 | Di-t-amyl Peroxide | 91.30 |
| Charge 3 | Hydroxypropyl Acrylate | 785.60 |
| | Butyl Acrylate | 1207.20 |
| | Acrylonitrile | 50.00 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at addition rate of 36.50 grams/hour over 2.5 hours. After 15 minutes charge 3 was added to the reactor at an addition rate of 1021.4 grams/hour over 2 hours. During the monomer addition the temperature was maintained at 150° C. at 60 PSI. After charge 2 and charge 3 were in the reactor, the reaction mixture was held for 2 hours. The reactor was then cooled to 25° C. GC analysis of the reaction mixture showed that all acrylates were reacted. The final solids of the resulting polymer was determined to be 82.92% at 110° C. for one hour. The copolymer had $M_n=1940$ and $M_w/M_n=2.3$. The $^{13}C$ NMR spectrum is consistent with a molar copolymer composition of 20% diisobutylene, 30% hydroxypropyl acrylate, 2% acrylonitrile, and 48% butyl acrylate.

EXAMPLE 7-W

Synthesis of copolymer diisobutylene-alt-hydroxypropyl acrylate/butyl acrylate/hydroxyethyl acrylate. The ingredients in Table 25 were used for the polymerization.

TABLE 25

| | Ingredients | Parts by weight (grams) |
|---|---|---|
| Charge 1 | Dilsobutylene | 1000.00 |
| Charge 2 | Di-t-amyl Peroxide | 91.30 |
| Charge 3 | Hydroxypropyl Acrylate | 392.80 |
| | Hydroxyethyl Acrylate | 392.80 |
| | Butyl acrylate | 1207.90 |

Charge 1 was added to a 4-liter stirred stainless steel pressure reactor. The reactor was then pressurized with nitrogen providing a 5 psig pad on the reactor. The agitation on the reactor was set at 500 rpm and the reactor temperature was adjusted to 150° C. Charge 2 was added to the reactor at addition rate of 36.50 grams/hour over 2.5 hours. After 15 minutes charge 3 was added to the reactor at an addition rate of 996.4 grams/hour over 2 hours. During the monomer addition the temperature was maintained at 150° C. at 60 PSI. After charge 2 and charge 3 were in the reactor, the reaction mixture was held for 2 hours. The reactor was then cooled to 25° C. GC analysis of the reaction mixture showed that all acrylates were reacted. The final solids of the resulting polymer were determined to be 81.17% determined at 110° C. for one hour. The copolymer had $M_n$=1700 and $M_w/M_n$=2.4. The $^{13}$C NMR spectrum is consistent with a copolymer composition of 20% diisobutylene, 15% hydroxypropyl acrylate, 15% hydroxyethyl acrylate, and 50% butyl acrylate.

EXAMPLE 7-X

Synthesis of copolymer diisobutylene/styrene-alt-hydroxpropyl acrylate/butyl acrylate/isobornyl acrylate. The ingredients in Table 26 were used for the polymerization.

TABLE 26

| | Ingredients | Parts by weight (grams) |
|---|---|---|
| Charge 1 | Diisobutylene | 1000.00 |
| Charge 2 | Di-t-amyl Peroxide | 90.00 |
| Charge 3 | Hydroxypropyl Acrylate | 900.00 |
| | Isobornyl Acrylate | 400.00 |
| | Butyl acrylate | 500.00 |
| | Styrene | 200.00 |

Charge 1 was added to a 4-liter stirred stainless steel pressure reactor. The reactor was pressurized with nitrogen providing a 5 psig pad on the reactor. The agitation on the reactor was set at 500 rpm and the reactor temperature was adjusted to 150° C. Charge 2 was added to the reactor at an addition rate of 36 grams/hour over a 2.5 hour period. After 15 minutes Charge 3 was added to reactor at an addition rate of 1000 grams/hour over a 2 hour period. During the monomer addition the temperature was maintained at 150° C. and 60 PSI. After Charges 2 and 3 were in the reactor, the reaction mixture was held for 2 hours. The reactor was than cooled to 25° C. GC analysis of the reaction mixture showed that all acrylates and styrene were reacted. The final solids of the resulting polymer was 83.12% determined at 110° C. for one hour. The copolymer had $M_n$=1400 and $M_w/M_n$=2.4. The $^{13}$C NMR spectrum was consistent with a molar copolymer composition of 22.1% diisobutylene, 35.0% hydroxypropyl acrylate, 15.6% isobornyl acrylate, 7.8% styrene, and 19.5% butyl acrylate.

EXAMPLE 7-Y

Synthesis of alternating copolymer diisobutylene-alt-hydroxypropyl acrylate/Butyl acrylate/N-butoxymethyl acrylamide. The ingredients in Table 27 were used in polymerization technique.

TABLE 27

| | Ingredients | Parts by weight (grams) |
|---|---|---|
| Charge 1 | Diisobutylene | 100.00 |
| Charge 2 | t-Amylperoxy(2-ethyl hexanoate) | 12 |
| Charge 3 | N-butoxymethyl acryamide (50% solution in butanol) | 10.00 |
| | Hydroxypropyl Acrylate | 78.50 |
| | Butyl Acrylate | 120.70 |

Charge 1 was added to a reaction flask equipped with an agitator, a thermocouple; and a $N_2$ inlet, placed under a blanket of $N_2$, and heated to 103° C. Charge 2 was added to the reactor over a 2.5 hour period. After 15 minutes Charge 3 was added to the reactor over a 2 hour period. During the monomer addition the temperature was maintained at 103° C. After Charges 2 and 3 were in the reactor, the reaction mixture was held for 2 hours. The reactor was then cooled to 25°C. GC analysis of the reaction mixture showed that all acrylates and acrylamide were reacted. The reaction flask was then equipped for simple vacuum distillation and the reaction mixture heated to 80° C. to remove the unreacted diisobutylene. The reaction mixture was cooled to 40° C. and 40 grams of Dowanol PM was added to the reaction mixture. The solids of the resulting polymer was 91% (in butyl alcohol) determined at 110° C. for one hour. The copolymer had $M_n$=4420 and $M_w/M_n$=3.4. The $^{13}$C NMR spectrum was consistent with a molar copolymer composition of 28% Diisobutylene, 28% Hydroxypropyl acrylate, 2% N-butoxymethyl acryamide, and 42% Butyl acrylate.

EXAMPLE 7-Z

Synthesis of alternating copolymer diisobutylene-alt-hydroxypropyl acrylate/butyl acrylate/poly(ethylene glycol) methyl ether acrylate. The ingredients in Table 28 were used in the polymerization technique.

TABLE 28

| | Ingredients | Parts by weight (grams) |
|---|---|---|
| Charge 1 | Diisobutylene | 100.00 |
| Charge 2 | t-Amylperoxy(2-ethyl hexanoate) | 12 |
| Charge 3 | Poly(ethylene glycol) methyl ether acrylate | 5.00 |
| | Hydroxypropyl Acrylate | 78.50 |
| | Butyl Acrylate | 120.70 |

Charge 1 was added to a reaction flask equipped with an agitator, a thermocouple, and a $N_2$ inlet, placed under a blanket of $N_2$, and heated to 103° C. Charge 2 was added to the reactor over a 2.5 hour period. After 15 minutes Charge 3 was added to the reactor over a 2 hour period. During the monomer addition the temperature was maintained at 103° C. After Charges 2 and 3 were in the reactor, the reaction mixture was held for 2 hours. The reactor was than cooled to 25° C. GC analysis of the reaction mixture showed that all acrylates were reacted. The solids of the resulting polymer were 78.4% determined at 110° C. for one hour. The copolymer had $M_n$=5230 and $M_w/M_n$=1.9. The $^{13}$C NMR spectrum was consistent with a molar copolymer composition of 26% diisobutylene, 25% hydroxypropyl acrylate, 2% poly(ethylene glycol) methyl ether acrylate, and 47% butyl acrylate.

EXAMPLE 8-AA

Synthesis of alternating copolymer diisobutylene-alt-methyl acrylate/butyl acrylate. The ingredients in Table 29 were used in the polymerization technique.

TABLE 29

| | Ingredients | Parts by weight (grams) |
|---|---|---|
| Charge 1 | Diisobutylene | 336.00 |
| Charge 2 | t-Amylperoxy(2-ethyl hexanoate) | 12 |
| Charge 3 | Methyl acrylate | 21.50 |
| | Butyl Acrylate | 128.00 |

Charge 1 was added to a reaction flask equipped with an agitator, a thermocouple, and a $N_2$ inlet, placed under a blanket of $N_2$, and heated to 103° C. Charge 2 was added to the reactor over a 4.5 hour period. After 15 minutes Charge 3 was added to the reactor over a 4 hour period. During the monomer addition the temperature was maintained at 103° C. After Charges 2 and 3 were in the reactor, the reaction mixture was held for 2 hours. The reactor was than cooled to 25° C. GC analysis of the reaction mixture showed that all acrylates were reacted. The reaction flask was then equipped for simple vacuum distillation and the reaction mixture heated to 80° C. to remove the unreacted diisobutylene. The reaction mixture was cooled to 40° C. and 60 grams of Dowanol PM was added. The solids of the resulting polymer were 75.6% determined at 110° C. for one hour. The copolymer had $M_n$=1530 and $M_w/M_n$=3.2. The $^{13}C$ NMR spectrum was consistent with a molar copolymer composition of 39.4% diisobutylene, 11.5% methyl acrylate and 49.1% butyl acrylate.

EXAMPLE 8-BB

Synthesis of alternating copolymer diisobutylene-alt-isobornyl acrylate/butyl acrylate. The ingredients in Table 30 were used in the polymerization technique.

TABLE 30

| | Ingredients | Parts by weight (grams) |
|---|---|---|
| Charge 1 | Diisobutylene | 224.00 |
| Charge 2 | t-Amylperoxy(2-ethyl hexanoate) | 12 |
| Charge 3 | Isobornyl acrylate | 104.2 |
| | Butyl Acrylate | 64.1 |

Charge 1 was added to a reaction flask equipped with an agitator, a thermocouple, and a $N_2$ inlet, placed under a blanket of $N_2$, and heated to 103° C. Charge 2 was added to the reactor over a 3.5 hour period. After 15 minutes Charge 3 was added to the reactor over a 3 hour period. During the monomer addition the temperature was maintained at 103° C. After Charges 2 and 3 were in the reactor, the reaction mixture was held for 2 hours. The reactor was then cooled to 25° C. GC analysis of the reaction mixture showed that all acrylates were reacted. The reaction flask was then equipped for simple vacuum distillation, the reaction mixture was heated to 80° C. to remove the unreacted diisobutylene. The reaction mixture was cooled to 40° C. and 60 grams of Dowanol PM was added. The solids of the resulting polymer were 72.9% determined at 110° C. for one hour. The copolymer had $M_n$=1880 and $M_w/M_n$=2.0. The $^{13}C$ NMR spectrum was consistent with a molar copolymer composition of 31.8% Diisobutylene, 35.5% Isobornyl acrylate and 32.7% Butyl acrylate.

EXAMPLE 8-CC

Synthesis of alternating copolymer diisobutylene-alt-acrylic acid. The ingredients in Table 31 were used in the polymerization technique.

TABLE 31

| | Ingredients | Parts by weight (grams) |
|---|---|---|
| Charge 1 | Dowanol PM | 500.00 |
| | Diisobutylene | 896.00 |
| Charge 2 | t-Amylperoxy(2-ethyl hexanoate) | 24 |
| Charge 3 | Acrylic acid | 400.00 |

Charge 1 was added a reaction flask equipped with an agitator, a thermocouple, and a $N_2$ inlet, placed under a blanket of $N_2$, and heated to 103° C. Charge 2 was added to the reactor over a 3.5 hour period. After 15 minutes Charge 3-was added to the reactor over a 3 hour period. During the monomer addition the temperature was maintained at 103° C. After Charges 2 and 3 were in the reactor, the reaction mixture was held for 2 hours. The reactor was than cooled to 25° C. GC analysis of the reaction mixture showed that the acrylic acid was completely reacted. The reaction flask was than equipped for simple vacuum distillation and the reaction mixture heated to 80° C. to remove unreacted diisobutylene and solvent. The solids of the resulting polymer were 99.1% determined at 110° C. for one hour. The copolymer had $M_n$=1860 and $M_w/M_n$=2.4. The $^{13}C$ NMR spectrum was consistent with a molar copolymer composition of 40% Diisobutylene and 60% Acrylic acid.

EXAMPLE 8-DD

This example describes the preparation of a sulfonium functional diisobutylene/acrylic resin prepared from a diisobutylene/styrene/glycidyl acrylate/hydroxypropyl acrylate alternating copolymer. The starting copolymer was prepared as described below from the ingredients in Table 32:

TABLE 32

| Ingredients | Parts by weight (grams) |
|---|---|
| Diisobutylene | 1000 |
| n-Methoxypropanol[1] | 700 |
| Styrene | 330 |
| Glycidyl acrylate | 120 |
| Hydroxypropyl acrylate | 150 |
| t-Amyl peroxy-2-ethylhexanoate | 34 |
| t-Amyl peroxy-2-ethylhexanoate | 8 |
| t-Amyl peroxy-2-ethylhexanoate | 12 |

[1]DOWANOL ® PM solvent, Dow Chemical Co., Midland MI

The diisobutylene and n-methoxypropanol were charged to a reaction vessel capable of holding pressure consistent with the reaction conditions. This mixture was then heated to reflux, approximately 100° C. A mixture of styrene, glycidyl acrylate, and hydroxypropyl acrylate was added over a period of 3 hours. At the same time, the first charge of t-amyl peroxy-2-ethylhexanoate was added over 3 hours. After the additions the copolymer was held for 2 hours at reflux. A sample for solids was used to determine whether the reaction was complete. After the hold period, 8 grams of t-amyl peroxy-2-ethylhexanoate was added, and the reaction held for 8 hours. A second addition of 12 grams t-amyl peroxy-2-ethylhexanoate followed, and the reaction held an additional 5 hours at reflux. At that point, the reaction had reached the theoretical non-volatile content of 47.3%. The unreacted diisobutylene was then removed under vacuum at 90–95° C. The final product was filtered through a 5 micron bag.

A sulfonium functional diisobutylene/acrylic resin was prepared from the starting copolymer of Table 32 as described below from the ingredients in Table 33.

TABLE 33

| Ingredients | Parts by Weight (in grams) |
|---|---|
| Acrylic-diisobutylene polymer of Table 32 | 1310.0 |
| Thiodiethanol | 366.0 |
| Lactic Acid | 81.8 |

TABLE 33-continued

| Ingredients | Parts by Weight (in grams) |
| --- | --- |
| Urethane Crosslinker described above | 662.5 |
| Deionized Water | 54.0 |
| Deionized Water | 1784.2 |
| Deionized Water | 1353.5 |

The diisobutylene-acrylic polymer was charged to a reaction vessel and heated to 80° C. Thiodiethanol, the first charge of deionized water, and lactic acid were then added to the reaction vessel. The reaction mixture was then held at 80° C. for 5 hours. At this point, urethane crosslinker was added to the reactor. After mixing for 15 minutes, the resin was dispersed into the second charge of deionized water which was at 25° C. After mixing for 30 minutes, the dispersion was reduced to its final solids with the third charge of deionized water. The dispersion had a non-volatile content of 20.3%.

EXAMPLE 8-EE

This example describes the preparation of a sulfonium group-containing diisobutylene/acrylic resin from a diisobutylene/hydroxypropyl acrylate/glycidyl methacrylate/2-ethylhexyl acrylate alternating co-polymer using di-tert-amyl peroxide as an initiator. The starting copolymer was prepared as described below from the ingredients in Table 34.

TABLE 34

| Ingredients | Parts by weight (grams) |
| --- | --- |
| Diisobutylene | 1000 |
| Di-tert-Amyl Peroxide | 45 |
| Hydroxypropyl Acrylate | 300 |
| Glycidyl Methacrylate | 300 |
| 2-Ethylhexyl Acrylate | 1400 |

The diisobutylene was charged to a reaction vessel capable of holding pressure consistent with the reaction conditions. The diisobutylene was heated to 150° C. The di-tert-amyl peroxide was added over 2.5 hours. 15 Minutes after starting the di-tert-amyl peroxide addition, the hydroxypropyl acrylate, glycidyl methacrylate, and 2-ethylhexyl acrylate, previously combined and mixed, was added over 2.0 hours. After the additions were complete the copolymer was held at 150° C. for 2.0 hours then cooled to ambient temperature. The polymer was found to have an epoxy equivalent weight of 1650. Percent non-volatile was measured to 75% with residual non-volatiles consisting of diisobutylene and decomposition products from the initiator. The sulfonium functional resin was prepared as described below from the ingredients in Table 35.

TABLE 35

| Ingredients | Parts by Weight (grams) |
| --- | --- |
| Starting copolymer of Table 34 | 771.5 |
| Thiodiethanol | 122.0 |
| Deionized Water | 27.0 |
| Lactic Acid | 40.9 |
| Deionized Water | 884.5 |
| Deionized Water | 572.2 |

The diisobutylene-acrylic copolymer of Table 34 was charged to a reaction vessel and heated to 80° C. Thiodiethanol, the first charge of deionized water, and lactic acid were then added to the reaction vessel. The reaction mixture was then held at 80° C. After five hours, an acid value of 6.5 and a sulfonium level of 0.185 meq/g were obtained. At this point the resin was dispersed with agitation into the second charge of deionized water which was at 25° C. After mixing for 30 minutes the dispersion was reduced to the proper solids with the final charge of deionized water. The dispersion had a non-volatile content of 25%.

EXAMPLE 9

This example set describes the preparation of electrodepositable coating compositions in the form of electrodeposition baths. The electrodepositable coating compositions were prepared as described below using the ingredients in Table 36.

TABLE 36

| | Parts by weight (grams) | | |
| --- | --- | --- | --- |
| Ingredient | Example 9 (Comparative) | Example 9N | Example 9O |
| E8003[1] | 817.0 | 735.3 | 735.3 |
| Amine salt dispersion of Example 5-N-D | | 128.8 | |
| Amine salt dispersion of Example 5-O-D | | | 108.5 |
| E8008[2] | 230.7 | 230.7 | 230.7 |
| Deionized water | 2752.4 | 2725.6 | 2725.6 |

[1]A cationic polyurethane resin available from PPG Industries, Inc.
[2]A pigment paste available from PPG Industries, Inc.

The E8003 cationic polyurethane was combined with 500.0 grams of the deionized water and stirred thoroughly. The cationic additives of Examples N and O were combined with 300.0 grams of the deionized water and stirred. This solution was then added to the reduced cationic polyurethane. Finally, the E8008 pigment paste was reduced with the remaining amount of deionized water, then added to the resin mixture under agitation.

The electrodepositable coating compositions were evaluated for oil-spot resistance. The purpose of this procedure is to measure a coatings resistance to visible defects such as craters, caused by surface oil contamination. The substrate used in this procedure was 4"×12" zinc phosphated cold rolled steel panels available as APR 28630 from ACT Laboratories, Inc., Hillsdale, Mich. The substrate was first electrocoated using ED7951 (a conductive black coating available from PPG Industries, Inc.) applied @ 0.75 mil. This first coat was cured for 25 minutes at 375° F. Three conveyor oils were used to test the oil-spot resistance of the electrodepositable coatings:

1. Moluballoy ICO Oil (ICO) chain oil from TRIBOL CORP., Sterling Heights, Mich.
2. Lubercon Series I (LUB) chain oil from LUBERCON MAINTENANCE, Fremont, Mich.
3. P80—a light transportation oil from Germany.

Prior to preparing the panels, the bath compositions were warmed to the coat out temperature of 90° F. The panel to be tested was placed on the bench, laying a divider on the panel, which divides the panel surface into three sections protected from one another. A toothbrush was dipped into the ICO oil, excess oil blotted off with a paper towel, and the oil gently flicked over the top section of the panel to give a spattered pattern of small droplets. The LUB oil was applied in a similar manner onto the middle section, and the P80 light transportation oil was applied to the bottom third of the panel. A separate toothbrush was used for each oil. The prepared panel was then placed immediately into the bath composition being tested and the electrodepositable composition was applied. Electrodeposition was carried out at 180 volts for 135 seconds. The test panels were cured for 30 minutes at 350° F. These conditions yielded approximately 1.4 mils of cured film. The panels were then visually inspected for defects and rated versus the comparative example (comparative rating=0). Results are shown in Table 37.

TABLE 37

| Bath | ICO | LUB | P80 |
|---|---|---|---|
| Example 9 Comparative | 0 | 0 | 0 |
| Example 9-N | ++ | ++ | ++ |
| Example 9-O | ++ | ++ | ++ |

These examples demonstrate the use the alternating copolymers of the present invention in an electrodeposition coating composition.

Example 10

This example demonstrates resistance to surface contamination when the present isobutylene type copolymers are used in a thermoset clearcoat composition.

A commercial, solvent-borne, thermoset clearcoat (OFDCT 8000, available from PPG Industries) was treated with 3% of the polymer of example 8-AA. The polymer was incorporated by thorough mixing into a sample of the commercially produced clear coat.

Commercially available electrocoated 4"×12" steel panels were spot contaminated with 0.1 to 0.2 microgram quantities of a series of polymers with varying surface tension. The two samples of the treated and one untreated clear coats were spray applied onto identically spot contaminated test panels. The clearcoat was applied in two coats with a sixty second flash in between, flashed for 10 minutes at ambient conditions and baked for 30 minutes at 285° F. The dry film thicknesses were 1.6–1.8 mils.

The ability of each clear coat to cover each of the contaminant polymers without leaving a visible defect has been correlated to its crater resistance. Each contaminant spot was rated against a set of arbitrarily defined standards. Typical ratings for each clear coat, with 100 as a perfect score, are as follows:

| | Rating |
|---|---|
| OFDCT 8000 untreated | 57 |
| FDCT 8000 + 3% additive | 89 |

Recoat adhesion was equal for the treated and untreated clear coats.

Example 11

This example demonstrates resistance to surface contamination when the present isobutylene type copolymers are used in a thermoset clearcoat composition.

A commercial, solvent-borne, thermoset clearcoat (DC5001, available from PPG Industries) was treated with 3% of the polymer of example 8-BB. The polymer was incorporated by thorough mixing into a sample of commercially produced clear coat.

Commercially available electrocoated 4"×12" steel panels were spot contaminated with 0.1 to 0.2 microgram quantities of a series of polymers with varying surface tension. Two treated and one untreated clear coats were spray applied onto identically spot contaminated test panels. The clearcoat was applied in two coats with a sixty second flash in between, flashed for 10 minutes at ambient and baked for 30 minutes at 285° F. Dry film thicknesses were 1.6–1.8 mils.

The ability of each clear coat to cover each of the contaminant polymers without leaving a visible defect has been correlated to its crater resistance. Each contaminant spot was rated against a set of arbitrarily defined standards. Typical ratings for each clear coat, with 100 as a perfect score, are as follows:

| | Rating |
|---|---|
| DC5001 untreated | 58 |
| DC5001 + 3% additive | 72 |

Recoat adhesion was equal for the treated and untreated clear coats.

Example 12

This example demonstrates the use of the present isobutylene type copolymers in a powder coating formulation, which is a grindable solid that forms a cured film when baked. The powder coating composition was prepared using the ingredients shown in Table 38.

TABLE 38

| Materials | Example V (g) |
|---|---|
| Polymer of example 8-CC | 7.0 |
| Hydroxy alkylamide[32] | 4.7 |
| Degasser[33] | 0.1 |
| Flow Agent[34] | 0.1 |

[32]Primid QM-1260, EMS Primid, Sumpter, S.C.
[33]Benzoin, Ura Flow B, Estron Chemical, Calvert City, KY.
[34]Resiflow PL-200, Monsanto.

Each component was mixed sequentially in a container. The mixture was then poured onto a heated 175° C. hot plate and stirred with a spatula until fluid. The mixture was then placed into a container and allowed to cool. Once cooled, it was ground into a fine powder using a mortar and pestle. The test substrate was ACT cold roll steel panels, 10.16 cm×30.48 cm (4"×12") available as APR10433 from ACT Laboratories, Inc., Hillsdale, Mich. The powder coating was dusted onto the surface of the steel panel which was placed on the 175° C. hot plate. As the powder began to flow, a straight edge was used to draw down the coating to cover the surface of the panel. The panel was then place into a 375° F. oven for 30 minutes and cured.

Gel point determination was measured on the powder coating as it was heated on the surface of a 175° C. hot plate. Time is measured from the point when the powder melts to the point it gels, i.e., forms a solid. The time is measured in minutes and seconds. When a powder starts to cure, it will begin to string. The flat part of the tongue depressor is pushed into the molten powder and pulled upward, roughly every 15 seconds until the melt no longer strings and the timer is stopped. This is the gel point determination. A shorter period of time to reach a gel point is preferred.

Methyl ethyl ketone (MEK) rub solvent resistance was used to determine the cure of the paint. Cheesecloth was moistened with MEK and, with moderate pressure, at a rate of about 1 double rub per second, rubbed over the painted panel until the coating becomes damaged. This test is typically run to 100 double rubs or failure of the coating, which ever occurs first. The higher the number of rubs, the better the cure of the coating. Table 39 shows the test results.

TABLE 39

|  | Example V |
|---|---|
| Gel Point | 30 Seconds |
| Mek double rubs | >100 |

The results demonstrate the good results achieved when the present isobutylene type copolymers are used in a powder coating formulation.

Example 13

This example demonstrates the generally poor results observed when poly(isobutylene—alt maleic acid) type polymers are formulated into a clearcoat system. The maleic acid polymer was prepared using the ingredients shown in Table 40.

TABLE 40

|  | Ingredients | Parts by weight (grams) |
|---|---|---|
| Charge 1 | Poly(isobutylene-alt-maleic anhydride)[35] | 200.00 |
| Charge 2 | M-pyrol | 400.00 |
| Charge 3 | DiH2O | 54.00 |

[34]Mw Ca. 60.000, Aldrich Chemical Company, Milwaukee, WI

Charges 1 and 2 were mixed until completely dissolved. Then Charge 3 was added and the mixture heated to 90° C. and held for 7 hours. The reactor was then cooled to 25° C. The solids of the resulting polymer were 45.6% determined at 110° C. for one hour. The resin had an acid value of 115.35.

A clearcoat was formulated by sequentially mixing each component in Table 41 with agitation.

TABLE 41

| Materials | Example X | Example Y |
|---|---|---|
| Methyl N-Amyl Ketone | 25 |  |
| Butyl Ether Diethylene Glycol Acetate | 5.0 |  |
| N-Amyl Alcohol | 4.1 |  |
| Methanol |  | 32.0 |
| GMA Acrylic Resin[35] | 87.89 | 86.1 |
| Acid Functional Crosslinker[36] | 63.69 |  |
| Poly(isobutylene-alt maleic acid) |  | 97.84 |

[35]50% glycidyl methacrylate, 0.2% methyl methacrylate, 7% styrene, 2.0% diphenyl-2, 4; methyl-4; pentene-1, 40.8% n-butyl methacrylate, 66% solids in 8/74/18 w/w odorless mineral spirits/Aromatic 100/methyl ether propylene glycol acetate.
[36]83/17 w/w methylhexahydrophthalic anhydride/pentaerythritol, 68% solids in 51/49 w/w n-propanol/n-amyl propionate.

The test substrate was ACT cold roll steel panels 10.16 cm×30.48 cm (4"×12") available as APR28215 from ACT Laboratories, Inc., Hillsdale, Mich. The clear coating compositions of examples X and Y were applied to the panels at ambient temperature using an 8-path Wet Film Applicator, #14 available from Paul N. Gardner Company, Inc. Dry film thickness was targeted for about 30 micrometers, 1.6 mils. Panels prepared from each coating were baked for 30 minutes at 141° C.

MEK rub solvent resistance, as described in example 18 was used to evaluate the cure of the paint. The results are shown in Table 42.

TABLE 42

|  | Comparative X | Example Y |
|---|---|---|
| Mek Double Rubs | 20 | 1 |

The results show the generally inferior results that are found when a difunctional acid acceptor monomer, such as maleic acid is used as a comonomer with isobutylene type acceptor monomers and formulated into a clearcoat system.

The present invention has been described with reference to specific details of particular embodiments thereof. It is not intended that such details be regarded as limitations upon the scope of the invention except insofar as and to the extent that they are included in the accompanying claims.

We claim:

1. A copolymer composition comprising a copolymer comprised of at least 30 mol % of residues having the following alternating structural units:

—[DM—AM]— wherein DM represents a residue from a donor monomer, AM represents a residue from an acceptor monomer, at least 15 mol % of the copolymer comprising a donor monomer having the following structure (I):

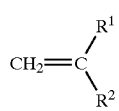

(I)

wherein $R^1$ is linear or branched $C_1$ to $C_4$ alkyl, $R^2$ is selected from the group consisting of methyl, linear, cyclic or branched $C_1$ to $C_{20}$ alkyl, alkenyl, aryl, alkaryl and aralkyl, at least 15 mol % of the copolymer comprising an acrylic monomer as an acceptor monomer, wherein the copolymer is substantially free of maleate monomer segments and fumarate monomer segments and the copolymer composition is substantially free of Lewis acids and transition metals.

2. The copolymer composition of claim 1, wherein the donor monomer is one or more selected from the group consisting of isobutylene, diisobutylene, dipentene, and isoprenol optionally in combination with styrene, substituted styrenes, methyl styrene, substituted styrenes, vinyl ethers, and vinyl pyridine.

3. The copolymer composition of claim 1, wherein the donor monomer of structure I is selected from the group consisting of isobutylene, diisobutylene, dipentene, isoprenol, and mixtures thereof.

4. The copolymer composition of claim 1, wherein the group $R^2$ of the donor monomer of structure I includes one or more functional groups selected from the group consisting of hydroxy, epoxy, carboxylic acid, ether, carbamate, and amide.

5. The copolymer composition of claim 1, wherein the acceptor monomer comprises one or more described by the structure (II):

  (II)

wherein W is selected from the group consisting of —CN, —X, and —C(=O)—Y, wherein Y is selected from the group consisting of —NR$^3_2$, —O—R$^5$—O—C(=O)—NR$^3_2$, and —OR$^4$, R$^3$ is selected from the group consisting of H, linear or branched C$_1$ to C$_{20}$ alkyl, and linear or branched C$_1$ to C$_{20}$ alkylol, R$^4$ is selected from the group consisting of H, poly(ethylene oxide), poly(propylene oxide), poly(caprolactone), linear or branched C$_1$ to C$_{20}$ alkyl, alkylol, aryl, alkaryl and aralkyl, linear or branched C$_1$ to C$_{20}$ fluoroalkyl, fluoroaryl, fluoroalkaryl and fluoroaralkyl, a siloxane radical, a polysiloxane radical, an alkyl siloxane radical, an ethoxylated trimethylsilyl siloxane radical and a propoxylated trimethylsilyl siloxane radical, R$^5$ is a divalent linear or branched C$_1$ to C$_{20}$ alkyl linking group, and X is a halide.

6. The copolymer composition of claim 1, wherein the acrylic monomer is one or more described by structure (III):

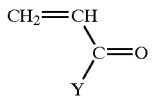  (III)

wherein Y is selected from the group consisting of —NR$^3_2$, —O—R$^5$—O—C(=O)—NR$^3_2$, and —OR$^4$, R$^3$ is selected from the group consisting of H, linear or branched C$_1$ to C$_{20}$ alkyl and linear or branched C$_1$ to C$_{20}$ alkylol, R$^4$ is selected from the group consisting of H, poly(ethylene oxide), poly (propylene oxide), linear or branched C$_1$ to C$_{20}$ alkyl, alkylol, aryl alkaryl and aralkyl, linear or branched C$_1$ to C$_{20}$ fluoroalkyl, fluoroaryl and fluoroaralkyl, a siloxane radical, a polysiloxane radical, an alkyl siloxane radical, an ethoxylated trimethylsilyl siloxane radical and a propoxylated trimethylsilyl siloxane radical, and R$^5$ is a divalent linear or branched C$_1$ to C$_{20}$ alkyl linking group.

7. The copolymer composition of claim 6, wherein Y includes at least one functional group of one or more selected from the group consisting of epoxy, carboxylic acid, hydroxy, amide, oxazoline, aceto acetate, isocyanate, carbamate, amine, amine salt, quaternized amine, thioether, sulfide, sulfonium salt, and phosphate.

8. The copolymer composition of claim 1, wherein the copolymer has a molecular weight of from 250 to 100,000.

9. The copolymer composition of claim 1, wherein the copolymer has a polydispersity index of less than 4.

10. The copolymer composition of claim 1, wherein the alternating structural units comprise at least 50 mol % of the copolymer.

11. The copolymer composition of claim 1, wherein the acceptor monomer is one or more selected from the group consisting of hydroxyethyl acrylate, hydroxypropyl acrylate, acrylic acid, methyl acrylate, ethyl acrylate, butyl acrylate, isobutyl acrylate, isobornyl acrylate, dimethylaminoethyl acrylate, acrylamide, chlorotrifluoro ethylene, glycidyl acrylate, 2-ethylhexyl acrylate, and n-butoxy methyl acrylamide.

12. The copolymer composition of claim 1, wherein the copolymer comprises one or more residues derived from other ethylenically unsaturated monomers of general formula V:

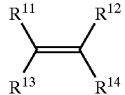  (V)

wherein R$^{11}$, R$^{12}$, and R$^{14}$ are independently selected from the group consisting of H, CF$_3$, straight or branched alkyl of 1 to 20 carbon atoms, aryl, unsaturated straight or branched alkenyl or alkynyl of 2 to 10 carbon atoms, unsaturated straight or branched alkenyl of 2 to 6 carbon atoms substituted with a halogen, C$_3$–C$_8$ cycloalkyl, heterocyclyl and phenyl, R$^{13}$ is selected from the group consisting of H, C$_1$–C$_6$ alkyl, COOR$^{15}$, wherein R$^5$ is selected from the group consisting of H, an alkali metal, a C$_1$ to C$_6$ alkyl group, glycidyl and aryl.

13. The copolymer composition of claim 12, wherein the other ethylenically unsaturated monomers are one or more selected from the group consisting of methacrylic monomers and allylic monomers.

14. A copolymer composition comprising a copolymer comprised of at least 30 mol % of residues having the following alternating structure:

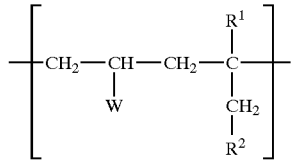

wherein R$^1$ is linear or branched C$_1$ to C$_4$ alkyl, R$^2$ is selected from the group consisting of methyl, linear, cyclic or branched C$_1$ to C$_{20}$ alkyl, alkenyl, aryl, alkaryl and aralkyl, W is selected from the group consisting of —CN, —X, and —C(=O)—Y, where Y is selected from the group consisting of —NR$^3_2$, —O—R$^5$—O—C(=O)—NR$^3_2$, and —OR$^4$, R$^3$ is selected from the group consisting of H, linear or branched C$_1$ to C$_{20}$ alkyl, and linear or branched C$_1$ to C$_{20}$ alkylol, R$^4$ is selected from the group consisting of H, poly(ethylene oxide), poly)propylene oxide), linear or branched C$_1$ to C$_{20}$ alkyl, alkylol, aryl, alkaryl and aralkyl, linear or branched C$_1$ to C$_{20}$ fluoroalkyl, fluoroaryl and fluoroaralkyl, a siloxane radical, a polysiloxane radical, an alkyl siloxane radical, an ethoxylated trimethylsilyl siloxane radical and a propoxylated trimethylsilyl siloxane radical, R$^5$ is a divalent linear or branched C$_1$ to C$_{20}$ alkyl linking group, and X is a halide, wherein the copolymer is substantially free of maleate monomer segments and fumarate monomer segments and the copolymer composition is substantially free of Lewis acids and transition metals.

15. The copolymer composition of claim 14, wherein Y includes at least one functional group of one or more selected from the group consisting of epoxy, carboxylic acid, hydroxy, amide, oxazoline, aceto acetate, isocyanate, carbamate, amine, amine salt, quaternized amine, thioether, sulfide, sulfonium salt, and phosphate.

16. The copolymer composition of claim 14, wherein the copolymer has a molecular weight of from 250 to 100,000.

17. The copolymer composition of claim 14, wherein the copolymer has a polydispersity index of less than 4.

18. The copolymer composition of claim 14, wherein the alternating structural units comprise at least 50 mol % of the copolymer.

19. The copolymer composition of claim 14, wherein the group R² includes one or more functional groups selected from the group consisting of hydroxy, epoxy, carboxylic acid, ether, carbamate, and amide.

20. The copolymer composition of claim 14, wherein the copolymer comprises one or more residues derived from other ethylenically unsaturated monomers of general formula V:

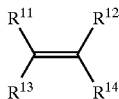

(V)

wherein $R^{11}$, $R^{12}$, and $R^{14}$ are independently selected from the group consisting of H, $CF_3$, straight or branched alkyl of 1 to 20 carbon atoms, aryl, unsaturated straight or branched alkenyl or alkynyl of 2 to 10 carbon atoms, unsaturated straight or branched alkenyl of 2 to 6 carbon atoms substituted with a halogen, $C_3$–$C_8$ cycloalkyl, heterocyclyl and phenyl, $R^{13}$ is selected from the group consisting of H, $C_1$–$C_6$ alkyl, $COOR^{15}$, wherein $R^{15}$ is selected from the group consisting of H, an alkali metal, a $C_1$ to $C_6$ alkyl group, glycidyl and aryl.

21. The copolymer composition of claim 20, wherein the other ethylenically unsaturated monomers are one or more selected from the group consisting of methacrylic monomers and allylic monomers.

22. A copolymer composition prepared by copolymerizing ethylenically unsaturated monomers by free radical polymerization in an environment substantially free of transition metals, Lewis acids, maleate-type monomers and fumarate-type monomers, resulting in a copolymer comprising at least 30 mol % of segments comprising alternating residues derived from a donor monomer and an acceptor monomer, wherein at least 15 mol % of the copolymer comprises a donor monomer having the following structure (I):

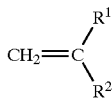

(I)

wherein $R^1$ is linear or branched $C_1$ to $C_4$ alkyl, $R^2$ is selected from the group consisting of methyl, linear, cyclic or branched $C_1$ to $C_{20}$ alkyl, alkenyl, aryl, alkaryl and aralkyl, and at least 15 mol % of the copolymer comprises an ethylenically unsaturated acceptor monomer.

23. The copolymer composition of claim 22, wherein the donor monomer is one or more selected from the group consisting of isobutylene, diisobutylene, dipentene and isoprenol optionally in combination with styrene, substituted styrenes, methyl styrene, substituted styrenes, vinyl ethers and vinyl pyridine.

24. The copolymer composition of claim 22, wherein the donor monomer is selected from the group consisting of isobutylene, diisobutylene, dipentene, isoprenol, and mixtures thereof.

25. The copolymer composition of claim 22, wherein the ethylenically unsaturated acceptor monomer comprises one or more described by the structure (II):

(II)

wherein W is selected from the group consisting of —CN, —X, and —C(=O)—Y, wherein Y is selected from the group consisting of —NR³₂, —O—R⁵—O—C(=O)—NR³₂, and —OR⁴, R³ is selected from the group consisting of H, linear or branched $C_1$ to $C_{20}$ alkyl, and linear or branched $C_1$ to $C_{20}$ alkylol, R⁴ is selected from the group consisting of H, poly(ethylene oxide), poly(propylene oxide), linear or branched $C_1$ to $C_{20}$ alkyl, alkylol, aryl, alkaryl and aralkyl, linear or branched $C_1$ to $C_{20}$ fluoroalkyl, fluoroaryl and fluoroaralkyl, a siloxane radical, a polysiloxane radical, an alkyl siloxane radical, an ethoxylated trimethylsilyl siloxane radical and a propoxylated trimethylsilyl siloxane radical, R⁵ is a divalent linear or branched $C_1$ to $C_{20}$ alkyl linking group, and X is a halide.

26. The copolymer composition of claim 22, wherein the ethylenically unsaturated acceptor monomer is one or more acrylic monomers described by structure (III):

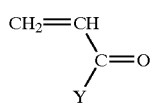

(III)

wherein Y is selected from the group consisting of —NR³₂, —O—R⁵—O—C(=O)—NR³₂, and —OR⁴, R³ is selected from the group consisting of H, linear or branched $C_1$ to $C_{20}$ alkyl, and linear or branched $C_1$ to $C_{20}$ alkylol, R⁴ is selected from the group consisting of H, poly(ethylene oxide), poly(propylene oxide), linear or branched $C_1$ to $C_{20}$ alkyl, alkylol, aryl and aralkyl, linear or branched $C_1$ to $C_{20}$ fluoroalkyl, fluoroaryl and fluoroaralkyl, a siloxane radical, a polysiloxane radical, an alkyl siloxane radical, an ethoxylated trimethylsilyl siloxane radical and a propoxylated trimethylsilyl siloxane radical, and R⁵ is a divalent linear or branched $C_1$ to $C_{20}$ alkyl linking group.

27. The copolymer composition of claim 26, wherein Y includes at least one functional group of one or more selected from the group consisting of epoxy, carboxylic acid, hydroxy, amide, oxazoline, aceto acetate, isocyanate, carbamate, amine, amine salt, quaternized amine, thioether, sulfide, sulfonium salt, and phosphate.

28. The copolymer composition of claim 22, wherein the copolymer has a molecular weight of from 250 to 100,000.

29. The copolymer composition of claim 22, wherein the copolymer has a polydispersity index of less than 4.

30. The copolymer composition of claim 22, wherein the segments comprising alternating residues comprise at least 50 mol % of the copolymer.

31. The copolymer composition of claim 26, wherein the ethylenically unsaturated acceptor monomer is one or more selected from the group consisting of hydroxyethyl acrylate, hydroxypropyl acrylate, acrylic acid, methyl acrylate, ethyl acrylate, butyl acrylate, isobutyl acrylate, isobornyl acrylate, dimethylaminoethyl acrylate, acrylamide, chlorotrifluoro ethylene, glycidyl acrylate, 2-ethylhexyl acrylate and n-butoxy methyl acrylamide.

32. The copolymer composition of claim 22, wherein the copolymer comprises one or more residues derived from other ethylenically unsaturated monomers of general formula V:

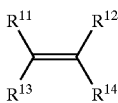

(V)

wherein $R^{11}$, $R^{12}$, and $R^{14}$ are independently selected from the group consisting of H, $CF_3$, straight or branched alkyl of 1 to 20 carbon atoms, aryl, unsaturated straight or branched alkenyl or alkynyl of 2 to 10 carbon atoms, unsaturated straight or branched alkenyl of 2 to 6 carbon atoms substituted with a halogen, $C_3$–$C_8$ cycloalkyl, heterocyclyl and phenyl, $R^{13}$ is selected from the group consisting of H, $C_1$–$C_6$ alkyl, $COOR^{15}$, wherein $R^{15}$ is selected from the group consisting of H, an alkali metal, a $C_1$ to $C_6$ alkyl group, glycidyl and aryl.

33. The copolymer composition of claim 32, wherein the other ethylenically unsaturated monomers are one or more selected from the group consisting of methacrylic monomers and allylic monomers.

34. The copolymer composition of claim 22, wherein the group $R^2$ of the donor monomer of structure I includes one or more functional groups selected from the group consisting of hydroxy, epoxy, carboxylic acid, ether, carbamate, and amide.

35. A copolymer composition comprising a copolymer comprised of at least 50 mol % of segments comprising alternating residues derived from a donor monomer selected from the group consisting of isobutylene, diisobutylene, dipentene, isoprenol and mixtures thereof, and an acrylic acceptor monomer, wherein said copolymer is substantially free of maleate-type monomer segments and fumarate-type monomer segments and said copolymer composition is substantially free of transition metals and Lewis acids.

36. The copolymer composition of claim 35, wherein the copolymer comprises up to 10 mol % of donor monomers selected from the group consisting of styrene, substituted styrenes, methyl styrene, substituted styrenes, vinyl ethers, vinyl pyridine, and mixtures thereof.

37. The copolymer composition of claim 35, wherein the copolymer further comprising up to 25 mol % of acrylonitrile.

38. The copolymer composition of claim 35, wherein the acrylic acceptor monomer is one or more described by structure (III):

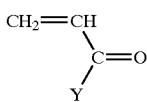

(III)

wherein Y is selected from the group consisting of —$NR^3_2$, —O—$R^5$—O—C(=O)—$NR^3_2$, and —$OR^4$, $R^3$ is selected from the group consisting of H, linear or branched $C_1$ to $C_{20}$ alkyl, and linear or branched $C_1$ to $C_{20}$ alkylol, $R^4$ is selected from the group consisting of H, poly(ethylene oxide), poly (propylene oxide), linear or branched $C_1$ to $C_{20}$ alkyl, alkylol, aryl, alkaryl and aralkyl, linear or branched $C_1$ to $C_{20}$ fluoroalkyl, fluoroaryl and fluoroaralkyl, a siloxane radical, a polysiloxane radical, an alkyl siloxane radical, an ethoxylated trimethylsilyl siloxane radical and a propoxylated trimethylsilyl siloxane radical, and $R^5$ is a divalent linear or branched $C_1$ to $C_{20}$ alkyl linking group, and X is a halide.

39. The copolymer composition of claim 38, wherein Y includes at least one functional group of one or more selected from the group consisting of epoxy, carboxylic acid, hydroxy, amide, oxazoline, aceto acetate, isocyanate, carbamate, amine, amine salt, quaternized amine, thioether, sulfide, sulfonium salt and phosphate.

40. The copolymer composition of claim 35, wherein the copolymer has a molecular weight of from 250 to 100,000.

41. The copolymer composition of claim 35, wherein the copolymer has a polydispersity index of less than 4.

42. The copolymer composition of claim 35, wherein the acrylic acceptor monomer is one or more selected from the group consisting of hydroxyethyl acrylate, hydroxypropyl acrylate, acrylic acid, methyl acrylate, ethyl acrylate, butyl acrylate, isobutyl acrylate, isobornyl acrylate, dimethylaminoethyl acrylate, acrylamide, chlorotrifluoro ethylene, glycidyl acrylate, 2-ethylhexyl acrylate and n-butoxy methyl acrylamide.

43. The copolymer composition of claim 35, wherein the copolymer comprises one or more residues derived from other ethylenically unsaturated monomers of general formula V:

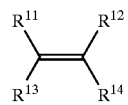

(V)

wherein $R^{11}$, $R^{12}$, and $R^{14}$ are independently selected from the group consisting of H, $CF_3$, straight or branched alkyl of 1 to 20 carbon atoms, aryl, unsaturated straight or branched alkenyl or alkynyl of 2 to 10 carbon atoms, unsaturated straight or branched alkenyl of 2 to 6 carbon atoms substituted with a halogen, $C_3$–$C_8$ cycloalkyl, heterocyclyl and phenyl, $R^{13}$ is selected from the group consisting of H, $C_1$–$C_6$ alkyl, $COOR^{15}$, wherein $R^{15}$ is selected from the group consisting of H, an alkali metal, a $C_1$ to $C_6$ alkyl group, glycidyl and aryl.

44. The copolymer composition of claim 43, wherein the other ethylenically unsaturated monomers are one or more selected from the group consisting of methacrylic monomers and allylic monomers.

* * * * *

UNITED STATES PATENT AND TRADEMARK OFFICE
CERTIFICATE OF CORRECTION

PATENT NO. : 6,686,432 B2  Page 1 of 1
DATED : February 3, 2004
INVENTOR(S) : Simion Coca et al.

It is certified that error appears in the above-identified patent and that said Letters Patent is hereby corrected as shown below:

Column 49,
Line 22, remove the comma after "C1".

Column 50,
Line 17, "R5" should read -- R15 --.

Signed and Sealed this

Twenty-sixth Day of July, 2005

JON W. DUDAS
*Director of the United States Patent and Trademark Office*